US012743819B2

(12) United States Patent
Tewel et al.

(10) Patent No.: US 12,743,819 B2
(45) Date of Patent: *Sep. 22, 2026

(54) TRAINING-FREE CONSISTENT TEXT-TO-IMAGE GENERATION

(71) Applicant: NVIDIA Corporation, Santa Clara, CA (US)

(72) Inventors: Yoad Tewel, Tel Aviv (IL); Rinon Pery Gal, Tel Aviv Yafo (IL); Yehonatan Kasten, Hinanit (IL); Yuval Atzmon, Hod Hasharon (IL); Gal Chechik, Ramat Hasharon (IL)

(73) Assignee: NVIDIA Corporation, Santa Clara, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 18/650,726

(22) Filed: Apr. 30, 2024

(65) Prior Publication Data

US 2025/0252613 A1 Aug. 7, 2025

Related U.S. Application Data

(60) Provisional application No. 63/550,259, filed on Feb. 6, 2024.

(51) Int. Cl.
*G06T 11/00* (2026.01)
*G06F 40/40* (2020.01)
(Continued)

(52) U.S. Cl.
CPC .............. *G06T 11/00* (2013.01); *G06F 40/40* (2020.01); *G06N 3/0475* (2023.01); *G06T 5/60* (2024.01);
(Continued)

(58) Field of Classification Search
CPC .... G06V 10/82; G06V 10/774; G06V 10/761; G06V 10/764; G06V 20/41; G06V 20/46;
(Continued)

(56) References Cited

U.S. PATENT DOCUMENTS

2025/0111866 A1* 4/2025 Ceylan Aksit ....... G11B 27/031

OTHER PUBLICATIONS

Khachatryan, Levon, et al. "Text2video-zero: Text-to-image diffusion models are zero-shot video generators." Proceedings of the IEEE/CVF International Conference on Computer Vision. Mar. 23, 2023. (Year: 2023).*

(Continued)

*Primary Examiner* — Xiao M Wu
*Assistant Examiner* — Scott E Sonners
(74) *Attorney, Agent, or Firm* — Leydig, Voit & Mayer, Ltd.

(57) ABSTRACT

Embodiments of the present disclosure relate to training-free consistent text-to-image generation. A pre-trained text-to-image diffusion model is leveraged to generate images depicting a consistent subject for diverse prompts describing scenes. Inputs to the model are a text description of at least one subject with prompts (scene text descriptions) describing scenes, where each prompt is associated with a different generated image and the text description is used for all images that depict the subject. Internal activations (intermediate data) computed by the model during generation of the different images are shared for generation of the different images. A subject-driven shared attention block and correspondence-based feature injection are incorporated into the model to promote subject consistency within each image and/or between images. Additionally, layout diversity is encouraged while maintaining subject consistency. The model achieves state-of-the-art performance on subject consistency and text alignment, without requiring any optimization and naturally extends to multi-subject scenarios.

22 Claims, 16 Drawing Sheets

(51) Int. Cl.
*G06N 3/0475* (2023.01)
*G06T 5/60* (2024.01)
*G06T 7/33* (2017.01)

(52) U.S. Cl.
CPC ...... *G06T 7/33* (2017.01); *G06T 2207/20081* (2013.01); *G06T 2207/20084* (2013.01)

(58) Field of Classification Search
CPC ...... G06V 20/70; G06V 10/25; G06V 10/806; G06V 40/10; G06V 40/172; G06V 10/26; G06V 20/49; G06V 10/40; G06V 30/18; G06V 10/70; G06V 40/171; G06V 10/95; G06V 10/80; G06V 30/153; G06V 10/7715; G06V 20/40; G06V 30/19173; G06V 20/48; G06T 11/00; G06T 2207/20081; G06T 2200/24; G06T 5/70; G06T 2207/10016; G06T 5/60; G06T 7/11; G06T 5/50; G06T 2207/20221; G06T 13/80; G06T 2207/20092; G06T 7/73; G06T 13/40; G06T 2207/30196; G06T 2207/30201; G06T 7/194; G06T 2211/441; G06T 3/4046; G06T 9/002; G06N 3/045; G06N 3/0475; G06N 3/08; G06N 3/047; G06N 20/00; G06N 3/0455; G06N 3/0464; G06N 3/088; G06N 3/084; G06N 3/09; G06N 3/094; G06N 3/096; G06N 7/01; G06N 5/04; G06N 3/02; G06N 3/048; G06F 40/40; G06F 40/30
See application file for complete search history.

(56) References Cited

OTHER PUBLICATIONS

Guo Y, Yang C, Rao A, Liang Z, Wang Y, Qiao Y, Agrawala M, Lin D, Dai B. Animatediff: Animate your personalized text-to-image diffusion models without specific tuning. arXiv preprint arXiv:2307.04725. Jul. 10, 2023. (Year: 2023).*
Guo, Y., et al., "Animateddiff: Animate your personalized text-to-image diffusion models without specific tuning," arXiv preprint arXiv:2307.04725, Jul. 10, 2023.
Gal, R., et al., "An image is worth one word: Personalizing text-to-image generation using textual inversion," International Conference Learning Representations, 2023.
Tewel, Y., et al., "Key-locked rank one editing for text-to-image personalization," InACM SIGGRAPH 2023 Conference Proceedings Jul. 23, 2023 (pp. 1-11).
Gal, R., et al., "Encoder-based domain tuning for fast personalization of text-to-image models," ACM Transactions on Graphics (TOG) 42, No. 4 (2023): 1-13.
Cao, M., et al., "MasaCtrl: Tuning-free mutual self-attention control for consistent image synthesis and editing," arXiv preprint arXiv:2304.08465, Apr. 2023.
Jain, Y., et al., "Peekaboo: Interactive video generation via masked-diffusion," arXiv preprint arXiv:2312.07509, Dec. 2023.

* cited by examiner

"wearing headphones with her cat"

"having a countryside picnic with her cat"

"in the snow, wearing headphones"

"cooking some food"

TRAINING-FREE CONSISTENT TEXT-TO-IMAGE GENERATION

CLAIM OF PRIORITY

This application claims the benefit of U.S. Provisional Application No. 63/550,259 titled "Learning Personalized Concepts from Generated Images," filed Feb. 6, 2024, the entire contents of which is incorporated herein by reference.

BACKGROUND

Text-to-image diffusion models enable generation of images from a text description (prompt) and a noise input. The text-to-image diffusion model generates an output image aligned to the text description by denoising the noise input (interpreted as an image) based on the prompt. Personalization of text-to-image models is the task of generating images of a specific object, given as one or more images of that specific object, and allowing users to use free text "prompts" to modify the object's appearance or compose the object in new roles and novel scenes.

The stochastic nature of the text-to-image diffusion models poses challenges when trying to portray a visually consistent subject (entity, object, or character) across diverse prompts, without providing images of the subject. Such consistency is important for many applications such as story-boarding, illustrating books and stories, designing virtual assets, and creating graphic novels and synthetic data. Existing techniques for providing consistency rely on personalization, requiring subject-specific training or fine-tuning the text-to-image diffusion model to learn a new word that represents a specific subject in a given image set. There is a need for addressing consistency issues and/or other issues associated with the prior art.

SUMMARY

Embodiments of the present disclosure relate to training-free consistent text-to-image generation. Systems and methods are disclosed that leverage a pre-trained text-to-image diffusion model to generate images depicting a consistent subject for diverse prompts describing scenes. Inputs to a consistent text-to-image generation system are a subject text description of at least one subject and prompts (scene text descriptions) describing scenes, where each prompt is associated with a different generated image and the subject text description is used for all images that depict the subject. In an embodiment, a subject text description is provided with each prompt, where the subject text description may be the same or different.

Existing techniques for providing consistency rely on personalization, requiring subject-specific training or fine-tuning the text-to-image diffusion model to learn a new word that represents a specific subject in a given image set. During the subject-specific training or fine-tuning, weights used by the text-to-image diffusion model are adjusted. In contrast with conventional personalization techniques, a pre-trained text-to-image diffusion model is used to implement the consistent text-to-image generation system and no further training is performed, so that weights for the text-to-image diffusion model are not modified. Internal activations (intermediate data) computed by the pre-trained text-to-image diffusion model during generation of the different images are shared for generation of the different images. A subject-driven shared attention block and correspondence-based feature injection are incorporated into the consistent text-to-image generation system to promote subject consistency within each image and/or between images. Additionally, layout diversity is encouraged while maintaining subject consistency. The consistent text-to-image generation system achieves state-of-the-art performance on subject consistency and text alignment, without requiring a single optimization step. Finally, the consistent text-to-image generation system naturally extends to multi-subject scenarios, and even enables training-free personalization for common objects.

In an embodiment, a method for training-free consistent text-to-image generation includes receiving a text description related to a subject with two or more prompts describing scenes for generation of two or more images depicting the subject. Intermediate data associated with the two or more images is generated by processing the text description and prompts by at least one layer of a neural network according to pre-trained weights. Cross-image consistency data specific to the subject is computed using the intermediate data and the cross-image consistency data is processed by at least one remaining layer of the neural network according to the pre-trained weights to generate the two or more images.

BRIEF DESCRIPTION OF THE DRAWINGS

The present systems and methods for training-free consistent text-to-image generation are described in detail below with reference to the attached drawing figures, wherein.

DETAILED DESCRIPTION

Figure 1A:
FIG. 1A illustrates images generated from a variety of input prompts with recurring subjects according to some embodiments of the present disclosure.
Figure 1A:
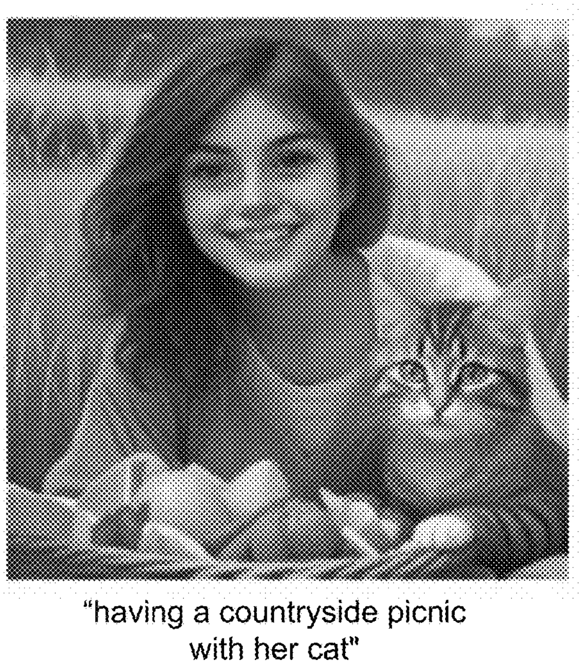
Figure 1A:
Figure 1A:

Systems and methods are disclosed related to training-free consistent text-to-image generation. A pre-trained text-to-image diffusion model is augmented to generate images depicting a consistent subject for diverse prompts describing scenes. Inputs to a consistent text-to-image generation system are a text description of at least one subject and prompts (scene text descriptions) describing scenes, where each prompt is associated with a different generated image and the text description is used for all images that depict the subject. In an embodiment, the text description is included with each prompt and the text description may be the same for each image or different for one or more of the images. In an embodiment, the text description is provided separately and is associated with the prompts. In another embodiment, the subject text description is provided as part of scene text descriptions (prompts)

The conventional approaches also attempt to enforce consistency a posteriori. That is, they reply on personalization, operating to make generated images consistent with a specific, given target. Such personalization requires subject-specific training or fine-tuning the text-to-image diffusion model to learn a new word that represents a specific subject in a given image set. During the subject-specific training or fine-tuning, weights used by the text-to-image diffusion model are adjusted. Personalization constrains the model's "creativity" to the given target image and tends to drive the model away from its training distribution.

In contrast with conventional personalization techniques, a pre-trained text-to-image diffusion model is used to implement the consistent text-to-image generation system and no further training is performed, so that weights for the text-to-image diffusion model are not modified. The limitations of a posteriori methods can be avoided, and consistency can be achieved in a zero-shot manner—without conditioning on existing images. The key idea is to promote cross-frame consistency a priori during image generation. Internal activations (intermediate data or feature representations) computed by the pre-trained text-to-image diffusion model during generation of the different images are shared for generation of the different images. The internal activations enhance a capacity for subject localization within each image and are used to align the generated images with each other and the text description and prompts, without any need to further align them with an external source. In doing so, on-the-fly consistent generation is enabled without requiring lengthy training or backpropagation, making generation roughly as much as twenty times faster than the current state-of-the-art.

A subject-driven shared attention block and correspondence-based feature injection are incorporated into the consistent text-to-image generation system to promote subject localization within each image and consistency of the subject across the images. Additionally, the subject-driven shared attention block encourages layout diversity while maintaining prompt-alignment. Finally, the consistent text-to-image generation system naturally extends to multi-subject scenarios, and even enables training-free personalization for common objects.

FIG. 1A illustrates images generated from a variety of input prompts with recurring subjects according to some embodiments of the present disclosure. The text description of the subject used for generating each of the images is "a hyper-realistic digital painting of a happy girl, brown eyes." Prompts used to generate each image are shown below each image. The subject (happy girl, brown eyes) has a consistent appearance in the generated images. Two additional subjects defined by the prompts, a cat and headphones, also have a consistent appearance in the generated images that include them. Note that the text description for the additional "cat" subject and the additional "headphones" subject is included in the two of the prompts instead of being provided separately.

The consistent text-to-image generation system operates in three steps. First, in an embodiment, the subject is localized across the intermediate data generated by processing a noise input along with the text description and prompts. Subject consistency is then encouraged by allowing the intermediate data for each generated image to attend to subject patches localized in the intermediate data via an extension of the self-attention mechanism. Attention between subject patches within the intermediate data leads to more consistent subjects across the generated images but causes the layout diversity to greatly diminish, as also observed when conventional text-to-image generation techniques are used. In an embodiment, a second step maintains diversity in two ways: by incorporating features from a vanilla, non-consistent sampling step, and by introducing inference-time dropout on shared keys and values computed by the subject-driven shared attention block using the intermediate data. Finally, to enhance consistency in finer details, self-attention output features (cross-image aligned data) are aligned between corresponding subject pixels across the generated images.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

In an embodiment, an example system is suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the system is within the scope and spirit of embodiments of the present disclosure.

Figure 1B:
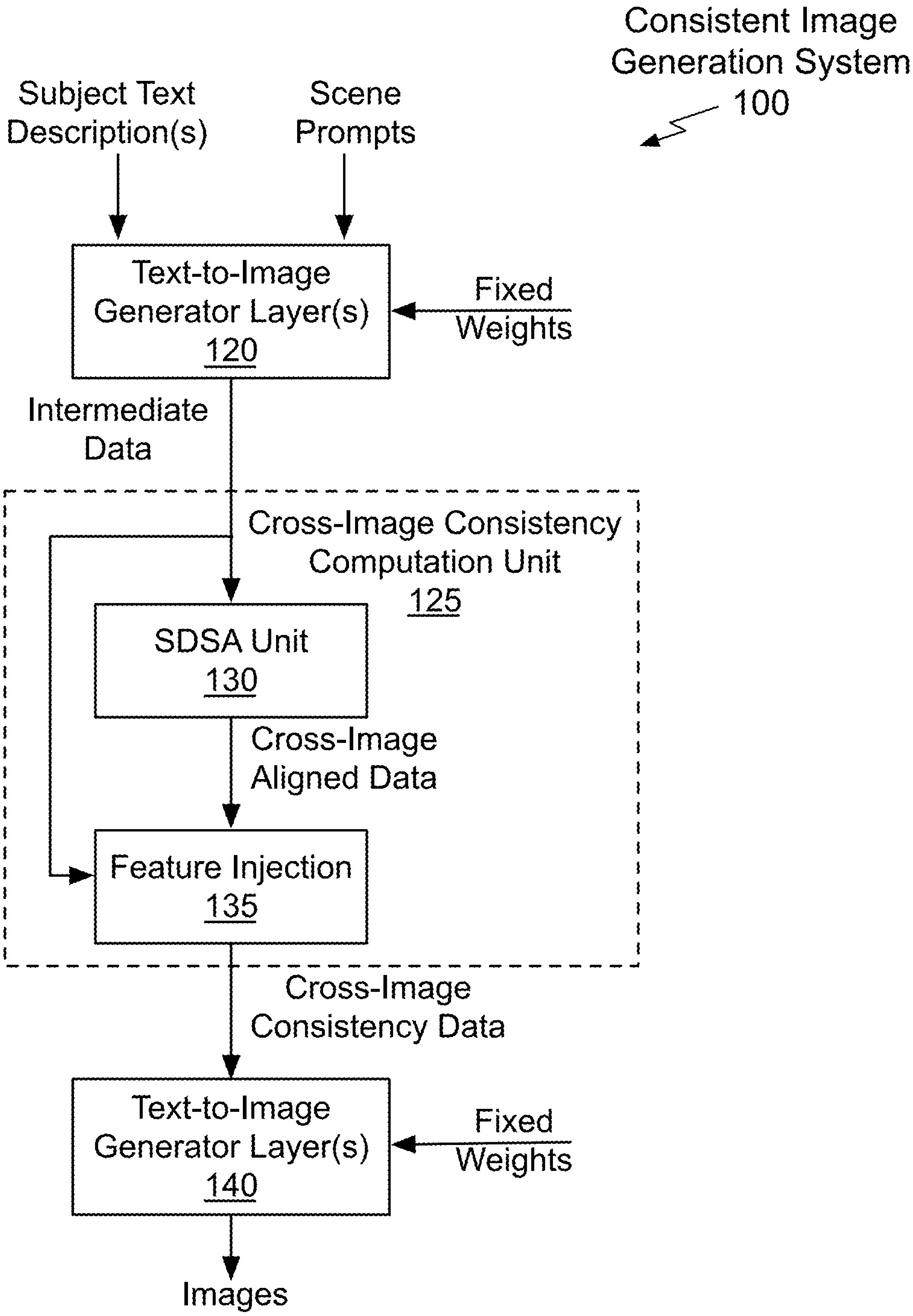
FIG. 1B illustrates an example consistent image generation system suitable for use in implementing some embodiments of the present disclosure.

FIG. 1B illustrates an example consistent image generation system 100 suitable for use in implementing some embodiments of the present disclosure. Inputs to the consistent image generation system 100 are a text description of at least one subject and prompts (scene text descriptions) describing scenes, where each prompt is associated with a different generated image and the text description is used for all images that depict the subject. In an embodiment, the subject text description(s) are included with one or more of the scene prompts. For example, two prompts that include the subject text description "dog" are "a dog with white fur running in a meadow" and "a photo of a living room with the cute dog lying on the couch."

The consistent image generation system 100 generates images depicting the subject according to each scene prompt. The consistent image generation system 100 includes a cross-image consistency computation unit 125 and a pre-trained text-to-image neural network model comprising multiple text-to-image generator layer(s) 120 and 140. In an embodiment, the neural network model is a diffusion model. In an embodiment, the neural network model is a generative model or other type of model. The multiple text-to-image generator layers 120 and 140 interleaved with at least one cross-image consistency computation unit 125. In the context of the following description, the text-to-image diffusion model is assumed to have been trained before being deployed for the generation of images in the consistent image generation system 100. Weights applied by layers of the text-to-image diffusion model are learned during training and the learned weights are then fixed (unchanged) for deployment of the text-to-image diffusion model. The text-to-image diffusion model also receives random noise as an input that is processed with a text description to produce an image based on the text description. The text-to-image diffusion model is therefore also referred to as a denoiser, where the random noise is interpreted as a noisy image that is denoised to generate an output image.

The first text-to-image generator layer 120 receives the subject text description(s), scene prompts, and a portion of the fixed (pre-trained) weights. The fixed weights are applied by the text-to-image generator layer(s) 120 to the text description(s) and prompts to produce intermediate data (activations). The cross-image consistency computation unit 125 processes the intermediate data to compute cross-image consistency data. The cross-image consistency computation unit 125 comprises a subject-driven self-attention (SDSA) unit 130 and a feature injection unit 135.

In an embodiment, the text description(s) and prompts are processed concurrently and the resulting activations output by one or more layers of the text-to-image generator are used by the SDSA unit 130 to localize an instance of the subject for each image being generated. The SDSA unit 130 generates subject-driven attention masks (subject masks) that provide cross-attention information. In an embodiment, the cross-attention information comprises attention between the image and the text description of the subject. In an embodiment, the SDSA unit 130 processes tokens comprising patches of activations (features) to compute input activations (cross-image aligned data) for the subsequent text-to-image generator layer. By sharing the subject masks, generation of each image may be influenced by intermediate data produced for the other images being concurrently generated from the prompts. The sharing functions to provide cross-image attention to improve consistency between pixels in different images. The SDSA unit 130 aligns visual attributes of the subject while also aligning the intermediate data for each image with the respective prompt to produce the cross-image aligned data.

The feature injection unit 135 builds a correspondence map for the subject between the cross-image aligned data for different images. Feature injection improves the fine visual features of the subject, providing more consistent appearance across the different generated images. More specifically, cross-image aligned data for corresponding regions of different images is blended. For example, cross-image aligned data for regions of the girl's nose and/or cat's eye associated with different images in FIG. 1A may be blended with the cross-image aligned data to produce the cross-image consistency data. In an embodiment, only regions within the subject masks are blended to avoid affecting the background. In an embodiment, the cross-image consistency data output by the cross-image consistency computation unit 125 comprises the output images.

A subsequent text-to-image generator layer 140 applies a portion of the fixed weights to the cross-image consistency data to produce images or additional intermediate data that is processed by another cross-image consistency computation unit 125 or text-to-image generator layer(s) to generate additional cross-image consistency data comprising images.

An overview of self-attention in text-to-image diffusion models is helpful to understand how the cross-image consistency computation unit 125 improves subject consistency. The cross-image consistency computation unit 125 replaces standard self-attention layers in a conventional text-to-image diffusion model. A self-attention layer receives a series of tokens, each of which contains features describing a single image patch. Each such token undergoes linear projections through three self-attention matrices: $W_K$, $W_V$, and $W_Q$. The results of these projections are known as "Keys", "Values" and "Queries", respectively.

More concretely, consider the $i^{th}$ image entry in a batch of images generated for prompts. Let $x_i \in \mathbb{R}^{P\times d}$ be a sequence of P input token vectors with feature dimension d. Then define $$K_i = x_i \cdot W_K,\ V_i = x_i \cdot W_V,\ Q_i = x_i \cdot W_Q.$$

the self-attention map is then given by:

$$A_i = \operatorname{softmax}\left(Q_i K_i^T / \sqrt{d_k}\right) \in \mathbb{R}^{P\times P}, \quad \text{Eq. (1)}$$

where $d_k$ is the feature dimension of $W_K$, $W_Q$ projections. Intuitively, the self-attention map provides a relevancy score between every pair of patches in the image. The self-attention map is then used to weight how much the "Value" features of a given target patch should influence a source patch $h_i = A_i \cdot V_i$, where h denotes an intermediary, hidden feature set. The hidden feature set is projected using a fourth, "output-projection" matrix, $W_O$, yielding $$x_i^{out} = W_o \cdot h_i,$$

which is then summed with the input features $x_i$ to create the input for the next layer.

The cross-image consistency computation unit 125 differs compared with the conventional self-attention mechanism by allowing a batch of generated images to attend to each other and also be influenced by each other's $x^{out}$ activations. Implementing cross-image consistency enables generation of a set of images portraying consistent subjects across an array of prompts. Compared with conventional self-attention, the internal activation of the text-to-image diffusion model is better aligned during image denoising. Importantly, in an embodiment, consistency is enforced exclusively through an inference-based mechanism, without additional training.

The cross-image consistency approach is comprised of three main components. First, a subject-driven attention mechanism is aimed at sharing subject-specific information across relevant model activations in a generated image batch for a set of prompts. The self-attention is expanded to allow queries from one image to also attend to keys and values computed for other generated images in a batch. The expansion enables repeated objects to naturally attend to each other, thus sharing visual features across images.

Second, because the subject-driven attention tends to reduce the variation in the generated layouts an attention-dropout mechanism is added and query features obtained from a vanilla, non-consistent, sampling step are blended. The attention dropout mechanism reduces the amount of information being shared at background patches. In an embodiment, to share subject appearance, the expanded self-attention is masked, so that queries from one image can only match keys and values from the same image, or from regions containing the subject in other images. This way, features for repeated subject elements can be shared, while background features remain separate.

Third, a feature injection mechanism is incorporated to further refine the results by mapping features from one generated image to another based on a cross-image dense-correspondence map derived from the diffusion features.

In an embodiment, subject masks are determined by identifying noisy latent patches that are likely to contain the subject using cross-image self-attention features. Specifically, the cross-image self-attention maps related to the subject token are averaged and thresholded across diffusion steps and text-to image generator layers 130 and 140 to create subject-specific masks. In an embodiment "Otsu's method" is used to extract the subject masks. With the extracted subject masks, subject-driven attention (SDSA) is performed where attention is masked so each image can only attend to its own patches or the subject patches within the batch.

Figure 1C:
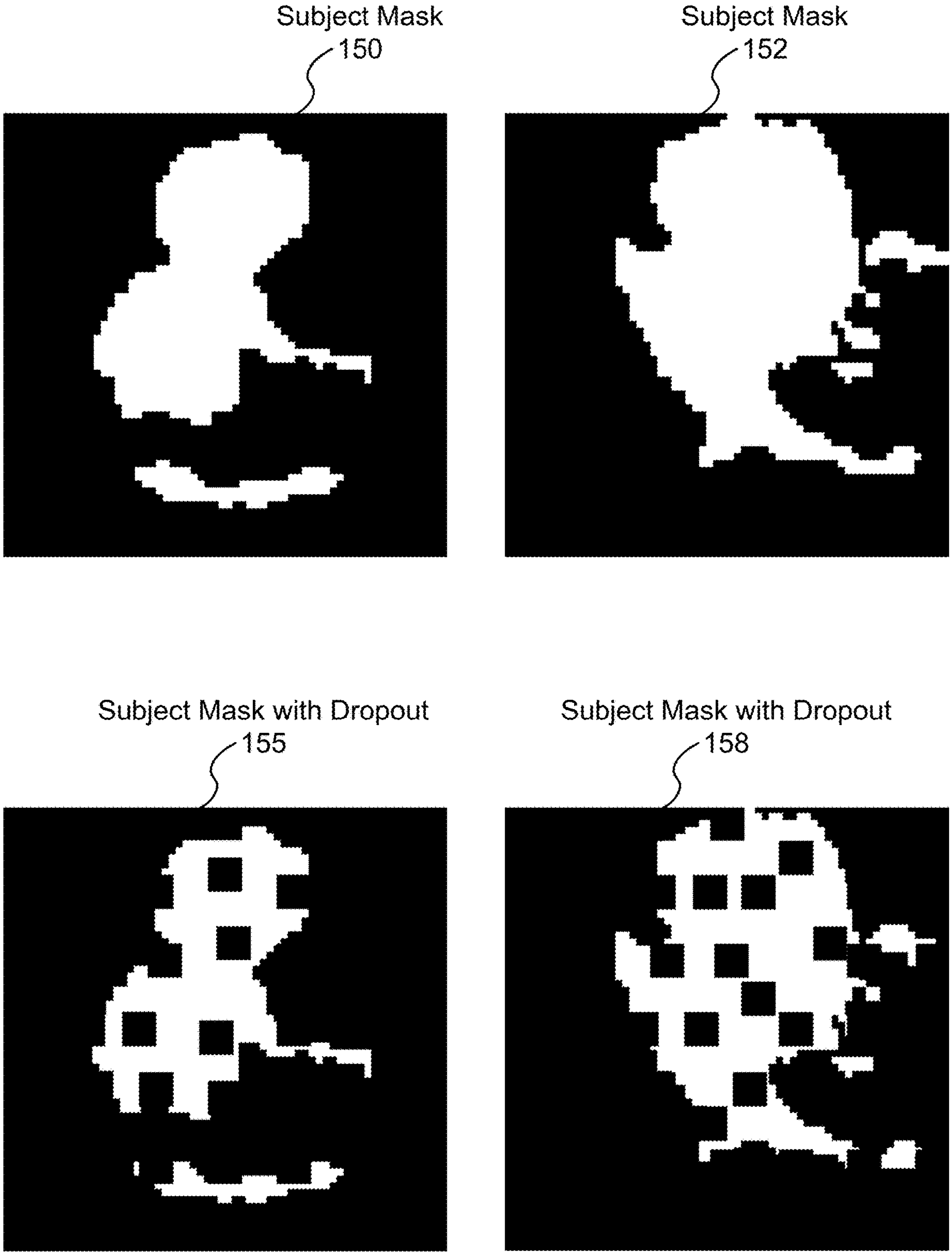
FIG. 1C is a conceptual illustration of subject-driven attention masks suitable for use in implementing some embodiments of the present disclosure.

FIG. 1C is a conceptual illustration of subject-driven attention masks suitable for use in implementing some embodiments of the present disclosure. Subject masks 150 and 152 are extracted from the intermediate data that is produced by the text-to-image generator layer(s) 120 processing the subject text description(s) and scene prompts. The subject masks 150 and 152 localize the subject within the intermediate data. The self-attention processing performed by the SDSA unit 130 is extended to operate across images, so the Query from generated image $I_i$ will also have access to the Keys from all other images in the batch ($I_j$, where $j \neq i$), restricted by their subject masks $M_j$.

The keys, values, and masks are represented as follows:

$$K^+ = [K_1 \oplus K_2 \oplus \ldots \oplus K_N] \in \mathbb{R}^{N \cdot P \times d_k} \quad \text{Eq. (2)}$$

$$V^+ = [V_1 \oplus V_2 \oplus \ldots \oplus V_N] \in \mathbb{R}^{N \cdot P \times d_v}$$

$$M_i^+ = [M_1 \ldots M_{i-1} \oplus 1 \oplus M_{i+1} \ldots M_N]$$

$M_i$ is the subject mask for the $i^{th}$ entry in the batch, and $\oplus$ indicates matrix concatenation. Note that the Query tensors remain unaltered, and that the concatenated mask $$M_i^+$$

is set to be an array of 1's for patch indices that belong to the $i^{th}$ image itself.

$$A_i^+ = \text{softmax}\left(Q_i K^{+T} \sqrt{d_k} + \log M_i^+\right) \in \mathbb{R}^{P \times N \cdot P} \quad \text{Eq. (3)}$$

$$h_i = A_i^+ \cdot V^+ \in \mathbb{R}^{P \times d_v}.$$

Softmax's logits are nulled by assigning their scores to $-\infty$ according to the mask.

The use of SDSA restores prompt alignment and avoids background collapse. However, SDSA can still lead to excessive similarity between image layouts. For example, subjects may be generated in similar locations and poses. To enhance layout variation and enrich diversity between the generated images, dropout is applied to the subject masks. Examples of applying dropout to the subject masks 150 and 152 produces the subject masks with dropout 155 and 158, respectively. Specifically, at each denoising step, a subset of patches from $M_i$ is randomly nullified (removed) by setting them to zero. Removing portions of the subject masks weakens the attention sharing between different images and subsequently promotes richer layout variations. Notably, by adjusting the dropout probability, the strength of consistency may be regulated, and a balance between visual consistency and layout variations may be controlled.

Separate subject masks are generated for individual subjects when multiple subjects are specified in the prompts. Conventional personalization-based approaches struggle in maintaining consistency over multiple subjects within a single image. In contrast, multi-subject consistent generation is possible in a simple, straightforward manner, when using the cross-image consistency computation unit 125 by combining the separate subject masks into single per-image masks. In an embodiment, the single per-image masks are a union of the subject masks. When the subjects are semantically different, information leakage between them is not a concern. This is due to the exponential form of the attention softmax, which acts as a gate that suppresses information leakage between unrelated subjects. Similarly, thresholding the correspondence map during feature injection yields a gating effect that safeguards against information leakage. For generation of video frames depicting a consistent subject, a background scene may be considered a second subject and the viewpoint (camera) is controlled. Furthermore, the consistent image generation system 100 is compatible with existing guided generation tools, such as pose control mechanisms that may be used to generate individual images and/or video frames.

To improve the layout diversity of the generated images, features from vanilla, non-consistent sampling may be incorporated by the SDSA unit 130. Text-to-image diffusion models may be used to combine the appearance of one image with the structure of another by injecting self-attention Keys and Values from the appearance image, and Queries from the structure image. Subject pose variation may be enhanced for the generated images by aligning the intermediate data more closely with a structure predicted by a more diverse vanilla denoising forward pass (i.e. without the SDSA modifications). In an embodiment, the vanilla denoising forward pass is focused on the early steps of the diffusion process, which have been shown to primarily control layout, by applying the following query-blending mechanism: Let $z_t$ be the noisy latents (intermediate data) at step t. The intermediate data is processed twice, once using the conventional self-attention to denoise the intermediate data and a second time using SDSA and the results are interpolated by the SDSA 130 to produce the cross-image aligned data. First, a vanilla denoising step is applied to $z_t$, without using the SDSA unit 130, and the self-attention queries generated by the layer(s) of the text-to-image generator are cached (stored):

$$Q_t^{vanilla}.$$

Second, the same latents $z_t$ are denoised again, this time using the SDSA unit 130 to produce $$Q_t^{SDA}.$$

During the second pass, the generated queries are linearly interpolated towards the vanilla queries, resulting in:

$$Q_t^* = (1 - v_t)Q_t^{SDA} + v_t Q_t^{vanilla} \quad \text{Eq. (4)}$$

where $v_t$ is a linearly decaying blending parameter.

Through the dropout and incorporation of features from a vanilla, non-consistent sampling step mechanisms, two aspects of the layout-collapse problem may be addressed: Query-feature blending allows to retain aspects of diversity from the non-consistent sampling, while attention-dropout encourages the consistent image generation system 100 to rely less on the shared keys and values, avoiding over-consistency. By mixing the mechanisms, increased diversity may be achieved without significant harm to consistency.

Figure 1D:
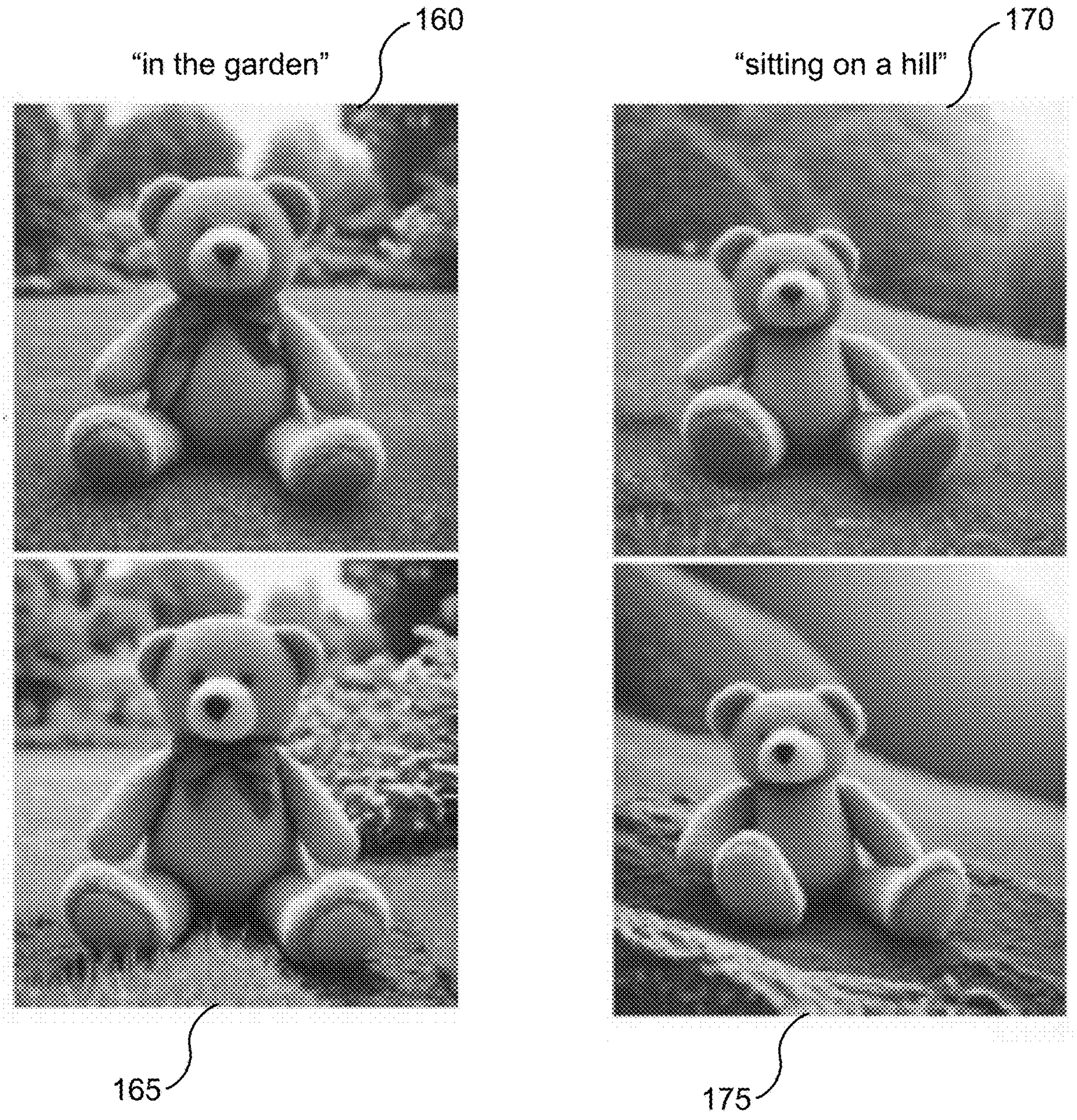
FIG. 1D illustrates images generated with and without use of a subject mask according to some embodiments of the present disclosure.

FIG. 1D illustrates images generated with and without use of a subject mask according to some embodiments of the present disclosure. Images 160, 165, 170, and 175 are generated using a text description "a photo of a teddy bear". The input prompts "in the garden" and "sitting on a hill" are input to the consistent image generation system 100 to generate the images 165 and 175, respectively. The images 160 and 170 are generated without using a subject mask for the subject (teddy bear). Generation of images is performed without limiting sharing of intermediate data to regions where the subject is present. Therefore, portions of the background scene may contribute to the regions where the subject is present and vice versa. Also, cross-image sharing occurs between the background scenes of the different images. Background leakage, meaning that the backgrounds are similar is visible in the images 160 and 170. Note that the images 160 and 170 both depict scenes with grass and trees. In contrast, the image 165 depicts a scene including grass, trees, and flowers while the image 175 depicts a scene including sand in the foreground and grass in the distance.

The shared attention mechanism implemented by the SDSA Unit 130 notably improves subject consistency but may struggle with fine visual features, which may weaken the subject's identity. Hence, to further improve consistency through a cross-image feature injection mechanism is performed by the feature injection 135. The similarity of features from corresponding regions (e.g. the left eye) is improved across different images in the batch. Specifically, substantial texture information is contained in the self-attention output features, $x^{out}$, and aligning these features between matching areas can enhance consistency.

To align the self-attention output features, in an embodiment, a patch correspondence map is constructed between every pair of images $I_t$ and $I_s$ in the batch, using diffusion-based feature maps $D_s, D_t \in \mathbb{R}^{P \times d_D}$, respectively, where $d_D$ is the feature dimension. Cross-image patch similarity scores are given by the cosine similarity between these features:

$$Sim(I_s, I_t)_{p_s,p_t} = \frac{D_s[p_s] \cdot D_t[p_t]}{\|D_s[p_s]\| \|D_t[p_t]\|}, \quad \text{Eq. (5)}$$

where $p_s$, $p_t$ are the indices of specific patches in the source and target image respectively and $D_s[p_s]$, $D_t[p_t]$ are the diffusion-based matrix rows (i.e., feature-vectors) matching these patches. Given these patch-similarity scores, a patch-wise dense-correspondence map $C_{t \to s}$ may be calculated:

$$\forall\, p_t \in I_t : C_{t \to s}[p_t] = \underset{p_s \in I_s}{\operatorname{argmax}}\, Sim(I_s, I_t)_{p_s,p_t}. \quad \text{Eq. (6)}$$

Intuitively, when applied on patch index $p_t$ from the target image $I_t$, $C_{t \to s}[p_t]$ yields the most similar patch in the source image $I_s$.

Figure 2A:
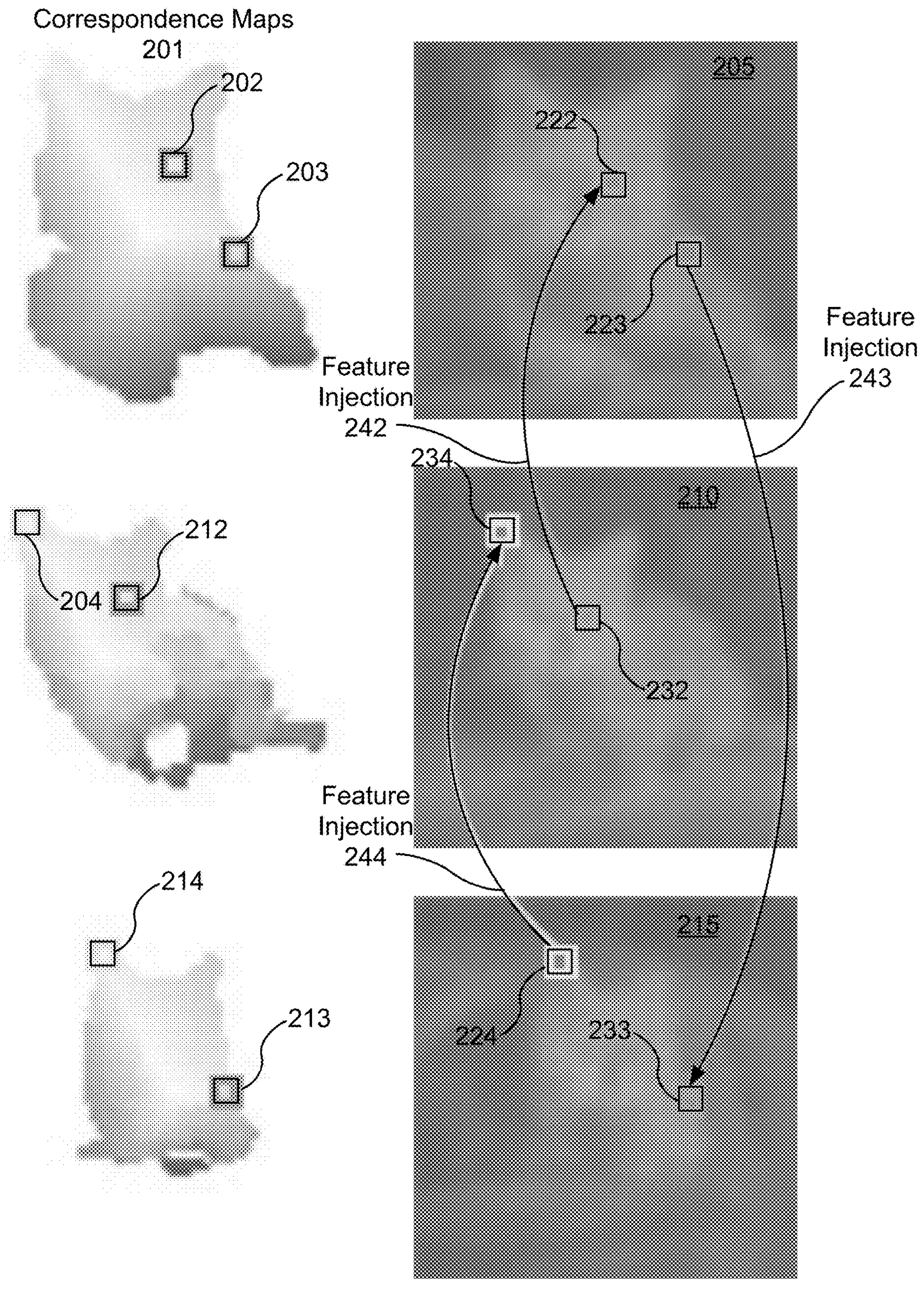
FIG. 2A is a conceptual illustration of feature injection suitable for use in implementing some embodiments of the present disclosure.

FIG. 2A is a conceptual illustration of feature injection suitable for use in implementing some embodiments of the present disclosure. Correspondence maps 201 computed using the cross-image aligned data 205, 210, and 215 for three images include patches 202, 203, 204, 212, 213, and 214. Patches 202 and 212 correspond, patches 203 and 213 correspond, and patches 204 and 214 correspond. Based on the correspondences, cross-image aligned data 232 (associated with the patch 212) is injected into the cross-image aligned data 205 at region 222 (associated with the patch 202). Based on the correspondences, cross-image aligned data 224 (associated with the patch 214) is injected into the cross-image aligned data 210 at region 234 (associated with the patch 204). Based on the correspondences, cross-image aligned data 223 (associated with the patch 203) is injected into the cross-image aligned data 215 at region 233 (associated with the patch 213).

In an embodiment, to promote feature similarity, corresponding features are blended based on the correspondences. In an embodiment, feature injection is extended to a many-to-one scenario, where each image $I_t$ is blended with the other images in the batch. For each patch index p in image $I_t$, its corresponding patches in all other images are compared and the one with the highest cosine similarity in the diffusion-based feature space, according to Equation (6), is selected.

Finally, the self-attention output layer features (cross-image aligned data) of the target image $$x_t^{out},$$

and its corresponding source patches, $$x_s^{out}$$

are blended:

$$\hat{x}_t^{out} = (1-\alpha)\cdot x_t^{out} + \alpha\cdot src(x_t^{out}), \quad \text{Eq. (7)}$$

where α is a blending parameter, and $$src(x_t^{out}) \in \mathbb{R}^{P\times d}$$

is the tensor obtained by pooling the corresponding features for each patch p in $$x_t^{out}$$

from the associated patch src(p).

In practice, to enforce consistency between appearances of the same subject, without affecting the background, the feature injection may be exclusively applied according to the subject masks Mi. Additionally, a threshold may be used to inject features only between patches with high enough similarity in the diffusion-based space. Such an approach ensures that features contributing to the appearance of the subject are collectively drawn from all source images, promoting a more comprehensive and representative synthesis.

Figure 2B:
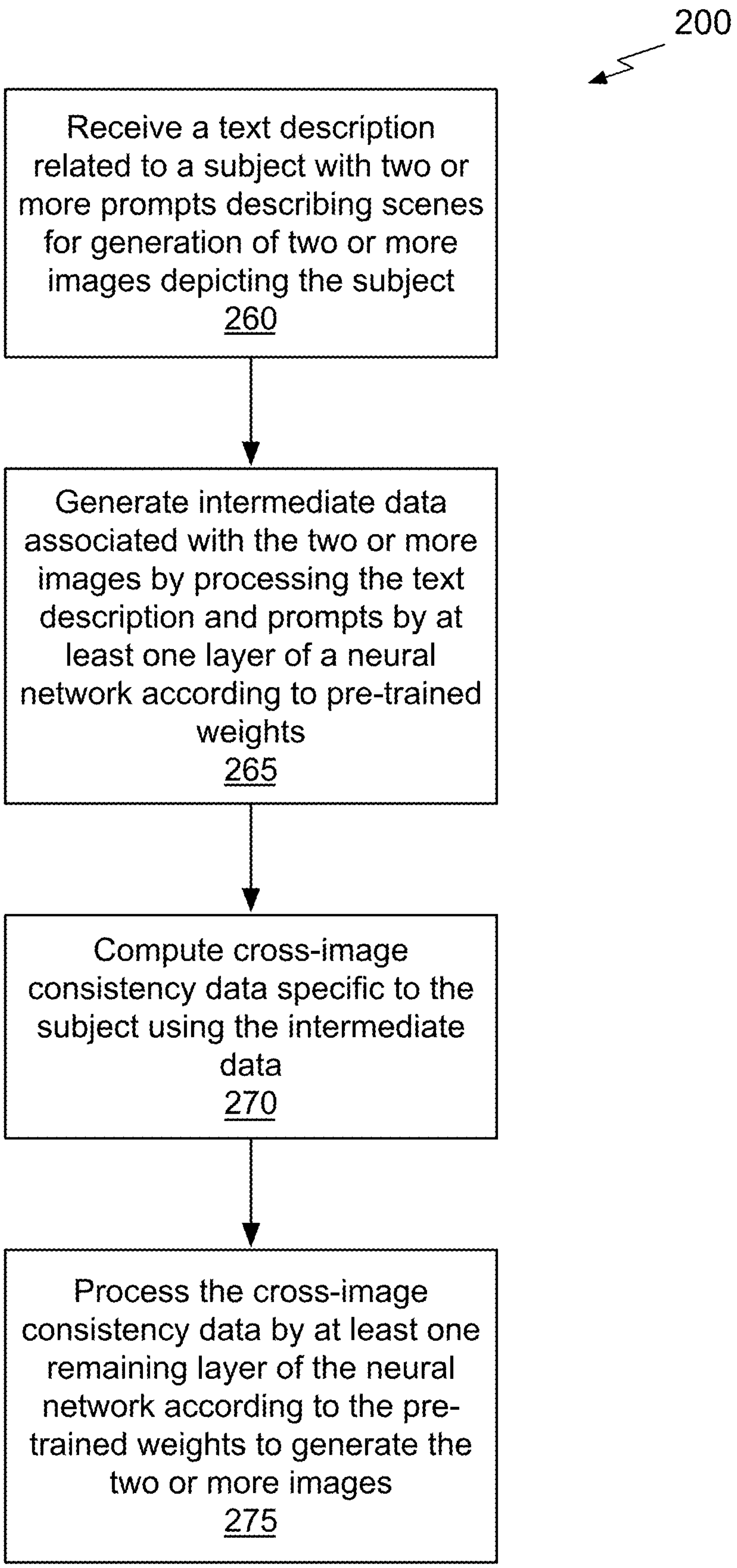
FIG. 2B illustrates a flowchart of a method for image generation suitable for use in implementing some embodiments of the present disclosure.

FIG. 2B is a flowchart of a method 200 for image generation suitable for use in implementing some embodiments of the present disclosure. Each block of method 200, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 200 is described, by way of example, with respect to the consistent image generation system 100. However, this method may additionally or alternatively be executed by any one system, or any combination of systems, including, but not limited to, those described herein. Furthermore, persons of ordinary skill in the art will understand that any system that performs method 200 is within the scope and spirit of embodiments of the present disclosure.

At step 260, a text description related to a subject is received with two or more prompts describing scenes for generation of two or more images depicting the subject. In an embodiment, the text description is included as part of each prompt. In an embodiment, the text description is provided separately from the prompt and the same text description is used with multiple prompts. In an embodiment, the pre-trained weights are determined by training a neural network to generate independent images in response to training text descriptions. At step 265, intermediate data associated with the two or more images is generated by processing the text description and prompts by at least one layer of a neural network according to pre-trained weights. In an embodiment, the intermediate data is generated by the text-to-image generator layer(s) 120. In an embodiment, the intermediate data is simultaneously generated for the two or more images in response to the text description with the two or more prompts. In an embodiment, the text-to-image generator layer(s) 120 also processes a random noise input to generate the intermediate data.

At step 270, cross-image consistency data specific to the subject is computed using the intermediate data. In an embodiment, the cross-image consistency data is computed by computing subject-driven attention masks (subject masks) localizing the subject in the intermediate data and combining the subject masks to compute the cross-image consistency data. In an embodiment, the SDSA Unit 130 computes the subject masks. In an embodiment, the subject masks comprise cross-attention masks. In an embodiment, portions of the subject masks are removed before the subject masks are combined. In an embodiment, the portions are adjusted according to a parameter. In an embodiment, a probability parameter adjusts a frequency with which random portions of the subject masks are removed or nullified. In an embodiment, portions of the combined subject masks are removed after the subject masks are combined.

In an embodiment, the cross-image consistency data is computed by (i) computing subject masks localizing the subject in the intermediate data, (ii) combining the subject masks for the two or more text descriptions to compute the cross-image aligned data, (iii) extracting a correspondence map between the intermediate data produced for each pair of the two or more prompts, (iv) identifying common features associated with the subject within the cross-image aligned data using the correspondence map, and (v) exchanging the common features in the cross-image aligned data to compute the cross-image consistency data. In an embodiment the cross-image aligned data is computed by the SDSA unit 130 and is processed by the feature injection 135 to produce the cross-image consistency data. In an embodiment, the cross-image consistency data is computed by (i) extracting a correspondence map between the intermediate data produced for each pair of the two or more prompts, (ii) identifying common features associated with the subject using the correspondence map, and (iii) exchanging the common features in the intermediate data to compute the cross-image consistency data.

In an embodiment, the two or more text descriptions are related to an additional subject and additional subject masks are computed that localize the additional subject in the intermediate data and the subject masks and the additional subject masks are merged before being combined. In an embodiment, the cross-image consistency data produced by combining the subject masks and denoised intermediate data are interpolated before the cross-image consistency data is processed by the at least one remaining layer. In an embodiment, the denoised intermediate data comprises intermediate data process according to vanilla, non-consistent sampling. In an embodiment, common features within the cross-image consistency data are aligned before the cross-image consistency data is processed by the at least one remaining layer.

At step 275, the cross-image consistency data is processed by at least one remaining layer of the neural network according to the pre-trained weights to generate the two or more images. In an embodiment, the two or more images comprise a video. In an embodiment, each one of the two or more images is used to generate a separate sequence (set of frames for a camera shot or scene) within a video. For example, a first prompt of the two or more prompts is used to generate a first image (frame) that is associated with a first shot of the video and a second prompt of the two or more prompts is used to generate a second image that is associated with a second shot of the video. In an embodiment, the first shot is associated with a first camera viewpoint and the second shot is associated with a second camera viewpoint. In an embodiment, first cross-image consistency data computed for the first prompt (first shot data) is used to generate the first shot and second cross-image consistency data computed for the second prompt (second shot data) is used to generate the second shot. In an embodiment, subject-specific data within the first and the second cross-image consistency data is used to generate both the first shot and the second shot.

In an embodiment, one or more of steps 260, 265, 270, and 275 is performed on a server or in a data center to generate the two or more images, and the two or more images are streamed to a user device. In an embodiment, one or more of steps 260, 265, 270, and 275 is performed within a cloud computing environment. In an embodiment, one or more of steps 260, 265, 270, and 275 is performed for training, testing, or certifying a neural network employed in a machine, robot, or autonomous vehicle. In an embodiment, one or more of steps 260, 265, 270, and 275 is performed on a virtual machine comprising a portion of a graphics processing unit.

Figure 2C:
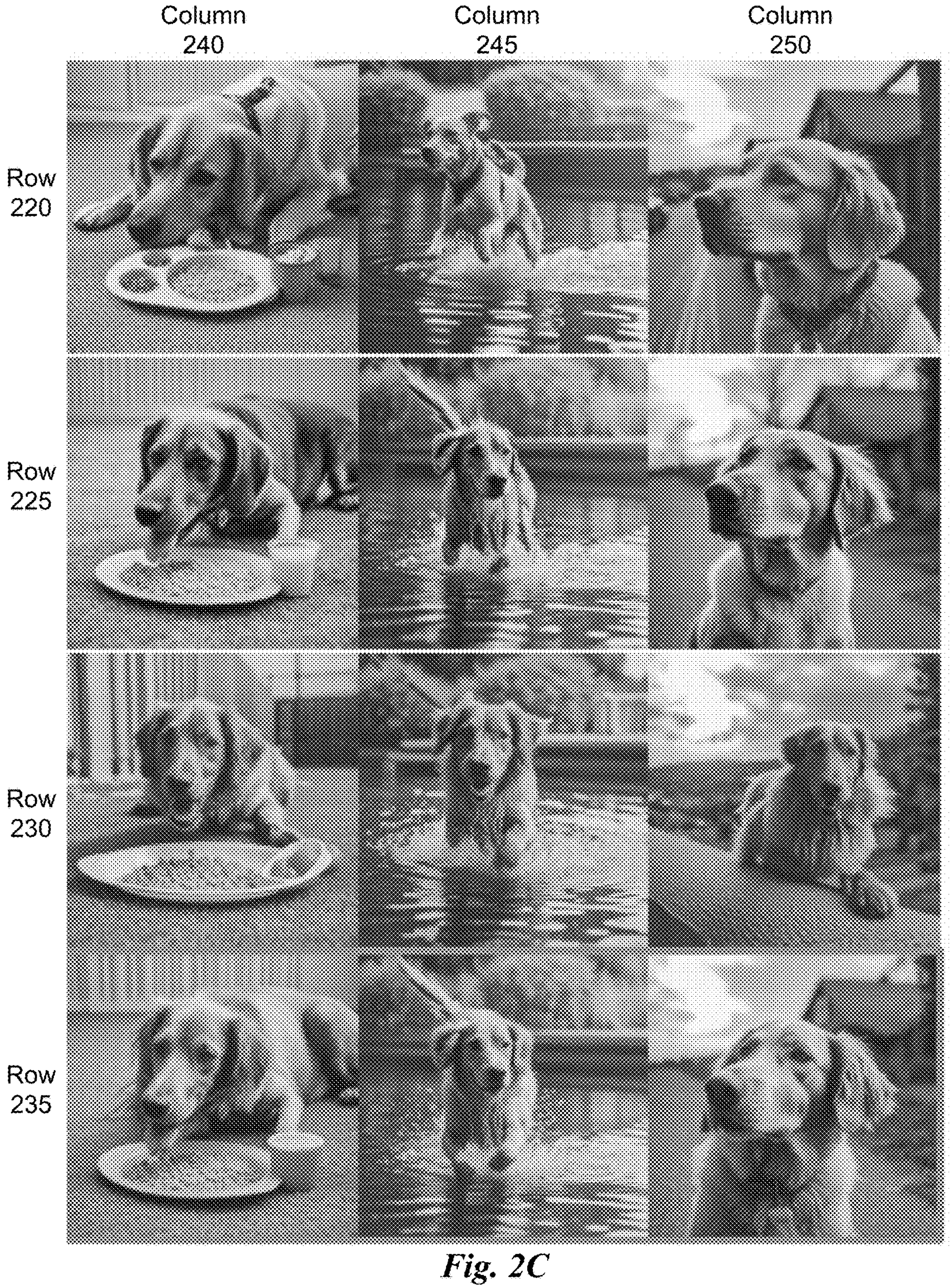
FIG. 2C illustrates images generated with various processing according to some embodiments of the present disclosure.

FIG. 2C illustrates images generated with various processing according to some embodiments of the present disclosure. A subject depicted in the generated images is a dog. Row 220 includes images generated without using SDSA. Row 225 includes images generated without feature injection. Row 230 includes images generated without variation operations of dropout and (vanilla) query-feature blending. Row 235 includes images generated using SDSA, feature injection, and the variation operations. Without the SDSA, appearance of the dog across row 220 is not consistent. In particular, the dog's appearance in column 245 of row 220 is different compared with columns 240 and 250 in the same row. Without the feature injection in row 225, the shape of the dog is consistent, but variations are visible in coloration of the dog's fur, particularly in column 250 where the dog has lighter colored fur at the shoulders compared with columns 240 and 245. Without the variation operations, the pose of the dog in the images of row 230 lacks variation. The generated images in row 235 depict a dog having consistent shape and color while also including variations in the background scene and pose of the dog.

In addition to generating independent images depicting one or more consistent subjects, the consistent image generation system 100 may also generate videos comprising a sequence of images (frames) depicting a consistent subject across several background scenes. For example, a first camera location corresponding to a first background scene may be used for a first sequence of frames generated depicting one or more subjects and a second camera location corresponding to a second background scene may be used for a second sequence of frames generated depicting the one or more subjects. In an embodiment, while the camera location is fixed, the viewpoint may vary due to pitch and/or yaw to generate a sequence of frames where the background appears to move slowly or quickly. In another example, the first shot of the video depicts a subject performing a first action in a first background scene, and the second shot of the video depicts the same subject performing a second action in a second background scene.

Conventional video generation techniques are created with a single prompt that is shared across frames in the same shot. In contrast, when using the consistent image generation system 100 to generate video diversity may be maintained in backgrounds and layouts. The consistent image generation system 100 first generates one or more images using text-to-image prompts and then each shot of the video is generated from a respective one of the generated images using an image-to-video prompt.

Figure 2D:
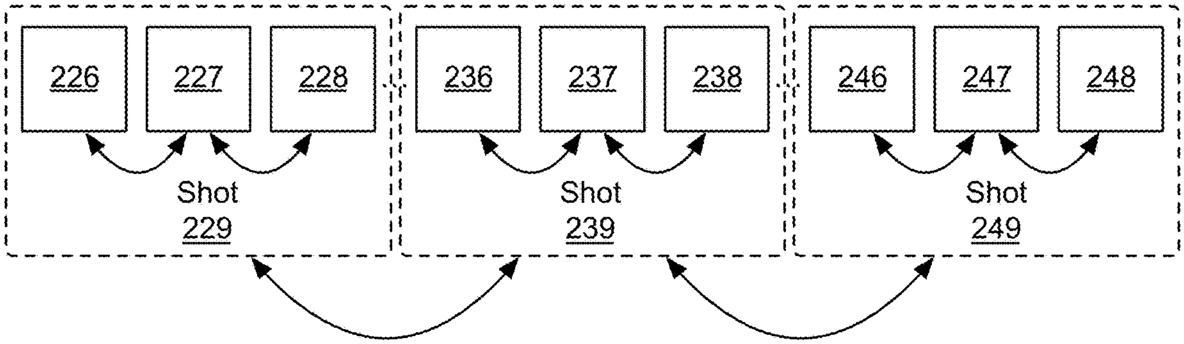
FIG. 2D illustrates video generated according to some embodiments of the present disclosure.

FIG. 2D illustrates video generated according to some embodiments of the present disclosure. An example workflow generates images that comprise frames of video for different shots (sequences or scenes). For example, three prompts may be used to generate three images 226, 236, and 246 depicting a consistent subject "girl wearing a red hood", where the three anchor images 226, 236, and 246 depict the girl packing groceries, in the woods, standing near a wolf, respectively. Each of the three images 226, 236, and 246 is an anchor image that may then be used to generate a different shot of the video, where a first shot 229, a second shot 239, and a third shot 249 depict "the girl takes groceries from the table and puts them in her bag", "she walks in the woods", and "the wolf snarls and takes the bag," respectively. In an embodiment, the text description of the subject and the three prompts are used to generate the first shot 229, second shot 239, and third shot 249.

Within a shot, cross-image attention is applied. Specifically, cross-image attention is applied between the anchor image 226, image 227, and image 228 within the shot 229. Similarly, cross-image attention is applied between the image 236, image 237, and image 238 within the shot 239. Cross-image attention is also applied between the image 246, image 247, and image 248 within the shot 249. Note that, in an embodiment, cross-image attention is not applied between images in different shots. Across the video (for multiple shots) subject-specific attention is applied. Specifically, subject-specific attention is applied between the images 226, 227, 228, 236, 237, 238, 246, 247, and 248 in shots 229, 239, and 249.

Instead of using a prompt to generate a consistent subject, another example workflow generates images depicting the subject using a definition of the subject comprising inputs and/or information previously used to generate at least one image of the same subject. In other words, the subject is effectively reusable as an anchor subject to generate new images. The definition of the subject may be used to generate the three images 226, 236, and 246 as anchor images. The definition of the subject may comprise information including one or more of noise seed input(s), the intermediate data (feature activations) that are generated and stored during generation of an image of the subject, the text description of the subject, correspondence maps, subject masks, and the prompt input(s). In an embodiment, the definition comprises an inverted image represented as a noise seed that, when processed by the neural network generates the image associated with the inverted image. In an embodiment, the definition of the subject is extracted from the images (real or synthetic) depicting the subject.

Figure 3A:
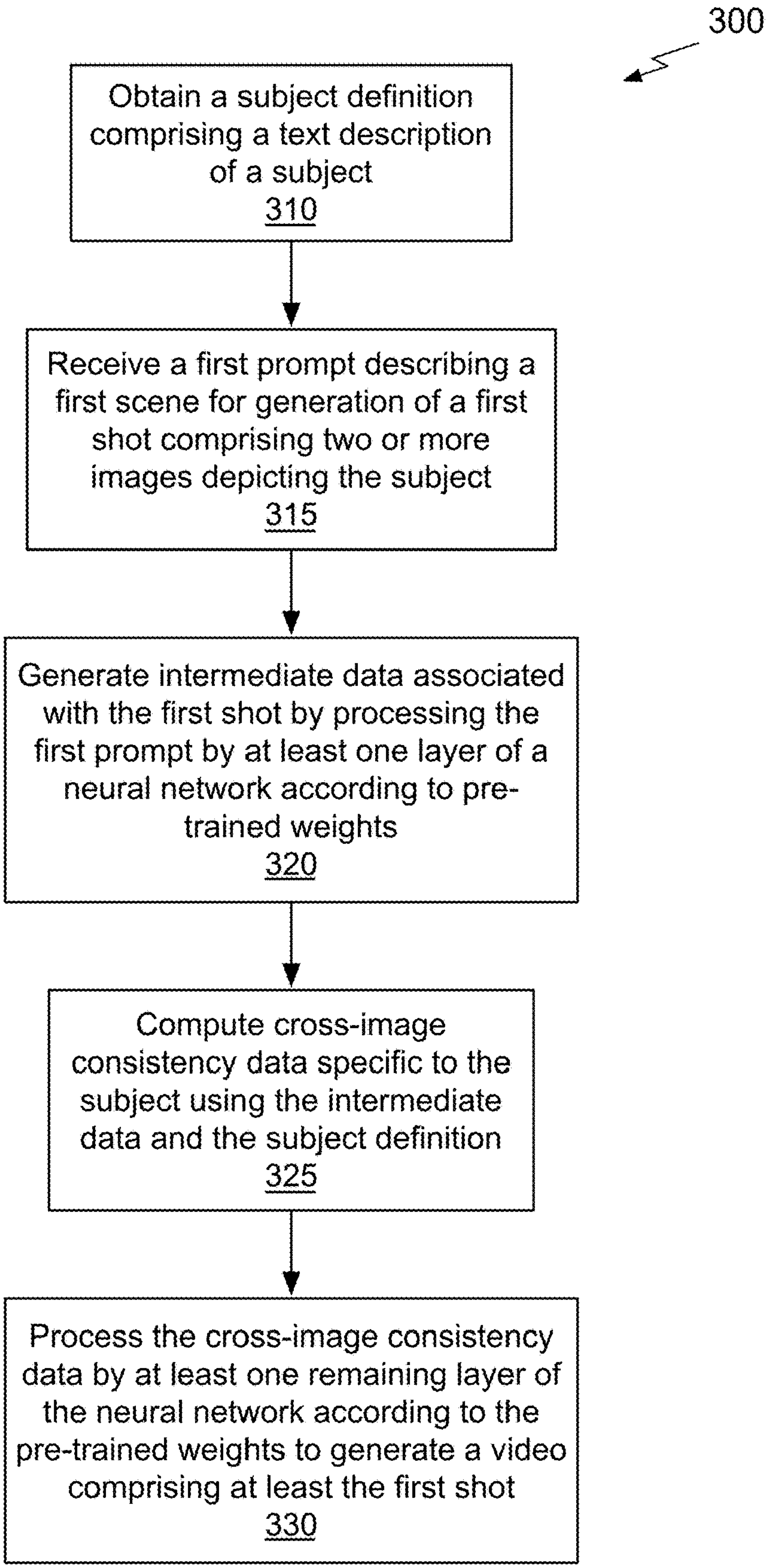
FIG. 3A illustrates a flowchart of a method for video generation suitable for use in implementing some embodiments of the present disclosure.

FIG. 3A illustrates a flowchart of a method 300 for video generation suitable for use in implementing some embodiments of the present disclosure. Each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the consistent image generation system 100. However, this method may additionally or alternatively be executed by any one system, or any combination of systems, including, but not limited to, those described herein. Furthermore, persons of ordinary skill in the art will understand that any system that performs method 300 is within the scope and spirit of embodiments of the present disclosure.

At step 310, a subject definition comprising a text description of a subject is obtained.

At step 315, a first prompt describing a first scene for generation of a first shot comprising two or more images depicting the subject is received. In an embodiment, the first prompt corresponds to one of the shots 229, 239, or 249. At step 320, intermediate data associated with the first shot is generated by processing the first prompt by at least one layer of a neural network according to pre-trained weights.

At step 325, cross-image consistency data specific to the subject is computed using the intermediate data and the subject definition. At step 330, the cross-image consistency data is processed by at least one remaining layer of the neural network according to the pre-trained weights to generate a video comprising at least the first shot. In an embodiment, the cross-image consistency data is computed by computing subject masks localizing the subject in the intermediate data and combining the subject masks. In an embodiment, before the cross-image consistency data is processed by the at least one remaining layer, interpolation is performed between denoised intermediate data and the cross-image consistency data produced by combining the subject masks. In an embodiment, before the cross-image consistency data is processed by the at least one remaining layer, common features within the cross-image consistency data are aligned. In an embodiment, a second prompt describing a second scene for generation of a second shot comprising two or more additional images depicting the subject is received. In an embodiment second intermediate data associated with the second shot is generated by processing the second prompt by at least one layer of the neural network according to the pre-trained weights, where the second intermediate data is used to compute the cross-consistency data. In an embodiment, subject-specific data within the cross-image consistency data is used to generate both the first shot and the second shot. In an embodiment, first shot data within the cross-image consistency data is used to generate both the first shot and the second shot. In an embodiment, first shot data within the cross-image consistency data is used to generate only the first shot and second shot data within the cross-image consistency data is used to generate only the second shot. In an embodiment, the pre-trained weights are determined by training the neural network to generate independent images in response to processing training text descriptions. In an embodiment, at least one of the steps 310, 315, 320, 325, and 330 is performed on a server or in a data center to generate the first shot and the first shot is streamed to a user device. In an embodiment, at least one of the steps 310, 315, 320, 325, and 330 is performed within a cloud computing environment. In an embodiment, at least one of the steps 310, 315, 320, 325, and 330 is performed for training, testing, or certifying a neural network employed in a machine, robot, or autonomous vehicle. In an embodiment, at least one of the steps 310, 315, 320, 325, and 330 is performed on a virtual machine comprising a portion of a graphics processing unit.

Figure 3B:
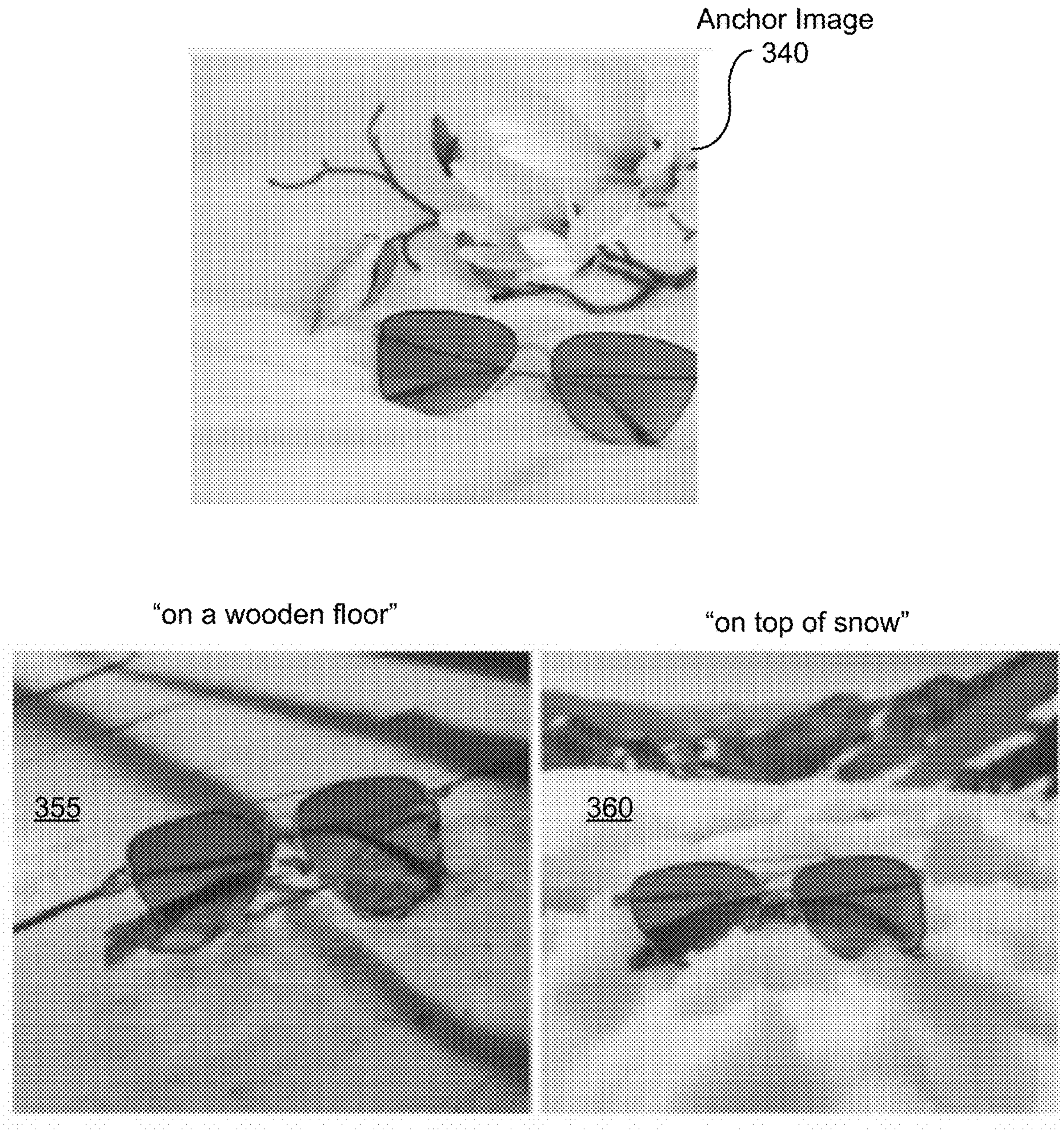
FIG. 3B illustrates images generated using an anchor image according to some embodiments of the present disclosure.

FIG. 3B illustrates images generated using an anchor image 340 according to some embodiments of the present disclosure. Although, a single anchor image 340 is illustrated, two or more anchor images that depict the subject may be selected as anchor images. In an embodiment, the anchor image(s) that depict the subject are identified, for example by a user selecting the anchor image(s). In an embodiment, the anchor image(s) are generated by the consistent image generation system 100.

In an embodiment, the anchor image(s) are real images captured in the wild. In an embodiment, the anchor image 340 is a real image and textual inversion is used to extract a definition of the subject (sunglasses). In an embodiment, the extracted definition comprises at least one of an embedding, subject text description, latent vector, intermediate data, and the like. In an embodiment, an encoder extracts the definition by processing a text description and the anchor image(s). For example, the definition of the sunglasses depicted in the anchor image 340 may be extracted using the text description "a photo of sunglasses" and the anchor image 340. The definition may then be used by the consistent image generation system 100 to generate additional images of the subject using additional prompts, such as the images 355 and 360 that are generated for the prompts "on a wooden floor" and "on top of snow," respectively.

In an embodiment, the definition is stored in a cache for use generating the additional images using additional prompts. In an embodiment, the definition is not cached, and the anchor image(s) are regenerated (using the definition) while the additional images are generated. When anchor images are regenerated, subject masks, keys, and/or values computed for the anchor images are used to generate the anchor images and the non-anchor (new) additional images while subject masks for non-anchor images may be set to fixed values (e.g., null masks). Similarly, cross-image aligned data for the anchor image(s) are blended according to the correspondence maps to generate the anchor images and the non-anchor additional images while cross-image aligned data from the non-anchor additional images are not blended to generate either the anchor images or the non-anchor additional images.

When the anchor image(s) are not regenerated and the definition of the subject is available either via inversion or stored, the subject masks defined for the anchor images are used to generate the non-anchor (new) images while subject masks computed for non-anchor additional images may be set to fixed values (e.g., null masks). Similarly, when the anchor image(s) are not regenerated, cross-image aligned data defining the anchor image(s) are blended according to the correspondence maps to generate the non-anchor additional images while cross-image aligned data from the non-anchor additional images are not blended to generate the non-anchor additional images. Using anchor image(s) to define a subject allows for faster inference and reduced memory requirements, because the size of extended attention is reduced. Additionally, using anchor image(s) can improve generation quality in terms of reduced artifacts when generating large quantities of additional images.

Figure 3C:
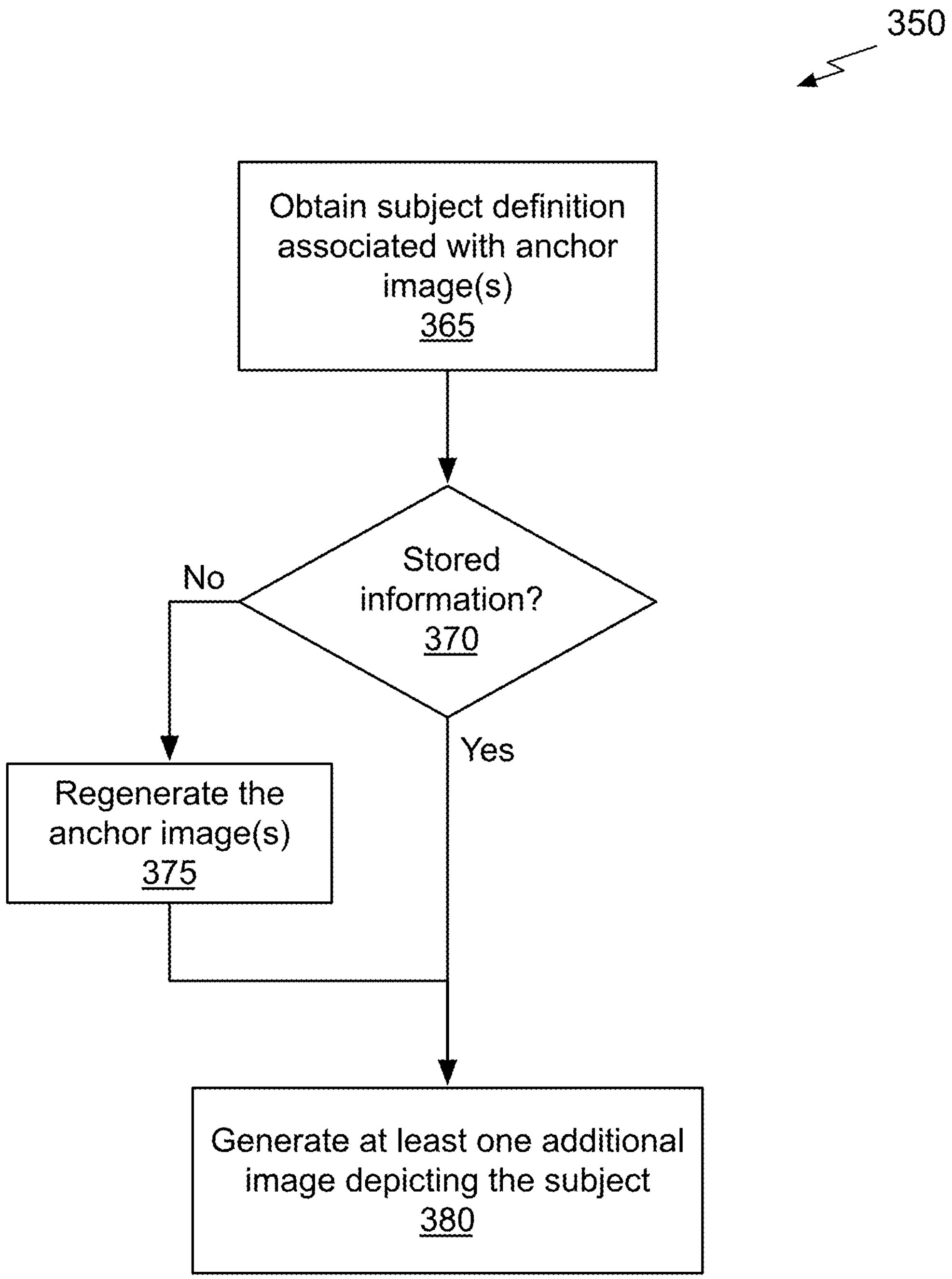
FIG. 3C flowchart of a method for image generation using an anchor image suitable for use in implementing some embodiments of the present disclosure.

FIG. 3C flowchart of a method 350 for image generation using an anchor image suitable for use in implementing some embodiments of the present disclosure. At step 365, a subject definition associated with anchor image(s) is obtained. In an embodiment, a subject depicted in multiple sequences of a video is defined using one or more anchor images. Anchor image(s) may also be used to define a subject depicted in independent images.

At step 370, the method determines if information defining the subject (subject definition) is stored, and, if not, then at step 375, the subject definition is processed by the consistent image generation system 100 to regenerate the anchor image(s). Otherwise, when the subject definition is stored, the consistent image generation system 100 need not regenerate the anchor image(s) to compute the information. At step 380, at least one additional image is generated depicting the subject.

In an embodiment, at least one anchor image is identified from two or more generated images, intermediate data and cross-image consistency data computed for the at least one anchor image is stored, and at least one additional prompt is processed by the at least one layer of the diffusion neural network according to the pre-trained weights to produce additional intermediate data associated with at least one additional image depicting the subject. In an embodiment, additional cross-image consistency data specific to the subject is computed using the additional intermediate data and the intermediate data and the additional cross-image consistency data and the cross-image consistency data is processed by the at least one remaining layer of the diffusion neural network according to the pre-trained weights to generate the at least one additional image.

In an embodiment, at least one anchor image is identified from two or more generated images, where each anchor image is associated with input seed noise. In an embodiment, the input noise and a text description corresponding to the at least one anchor image and at least one additional text description are processed by the at least one layer of the diffusion neural network, according to the pre-trained weights, to produce a portion of the intermediate data associated with the at least one anchor image and additional intermediate data associated with at least one additional image depicting the subject. In an embodiment, additional cross-image consistency data specific to the subject is computed using the additional intermediate data and the portion of the intermediate data. In an embodiment, the additional cross-image consistency data is processed by the at least one remaining layer of the diffusion neural network, according to the pre-trained weights, to regenerate the at least one anchor image and generate the two or more additional images.

The consistent image generation system 100 and methods 200, 300, and 350 implement a training-free technique for generating independent images and video including one or more visually consistent subjects. The consistent image generation system 100 and methods 200, 300, and 350 leverage a pre-trained text-to-image diffusion model to generate images depicting a consistent subject for diverse prompts describing scenes. In contrast with conventional personalization techniques, no further training is needed, so that weights for the text-to-image diffusion model are not modified. Internal activations (intermediate data) computed by the pre-trained text-to-image diffusion model during generation of the different images are shared for generation of the different images. Subject-driven shared attention and correspondence-based feature injection are incorporated into the consistent image generation system to promote subject consistency within each image and/or between images. Additionally, layout diversity is encouraged while maintaining subject consistency. The consistent image generation system 100 and methods 200, 300, and 350 achieve state-of-the-art performance on subject consistency and text alignment.

Parallel Processing Architecture

Figure 4:
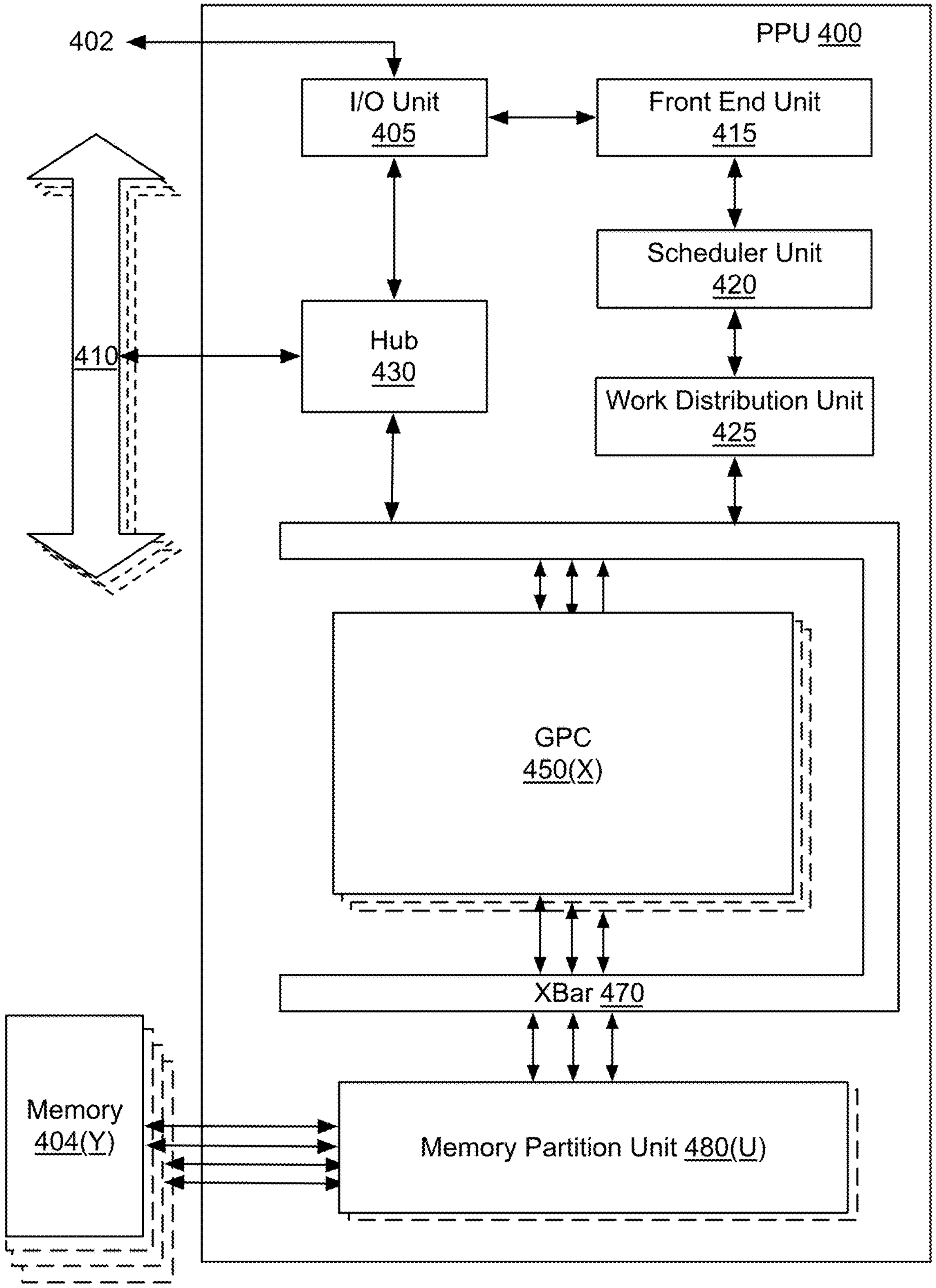
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement a method or system for training-free consistent text-to-image generation. The PPU 400 may be used to implement the consistent image generation system 100. The PPU 400 may be used to implement one or more of the text-to-image generator layer(s) 120, cross-image consistency computation unit 125, and text-to-image generator layer(s) 140 within the consistent image generation system 100.

In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing Systemcross

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
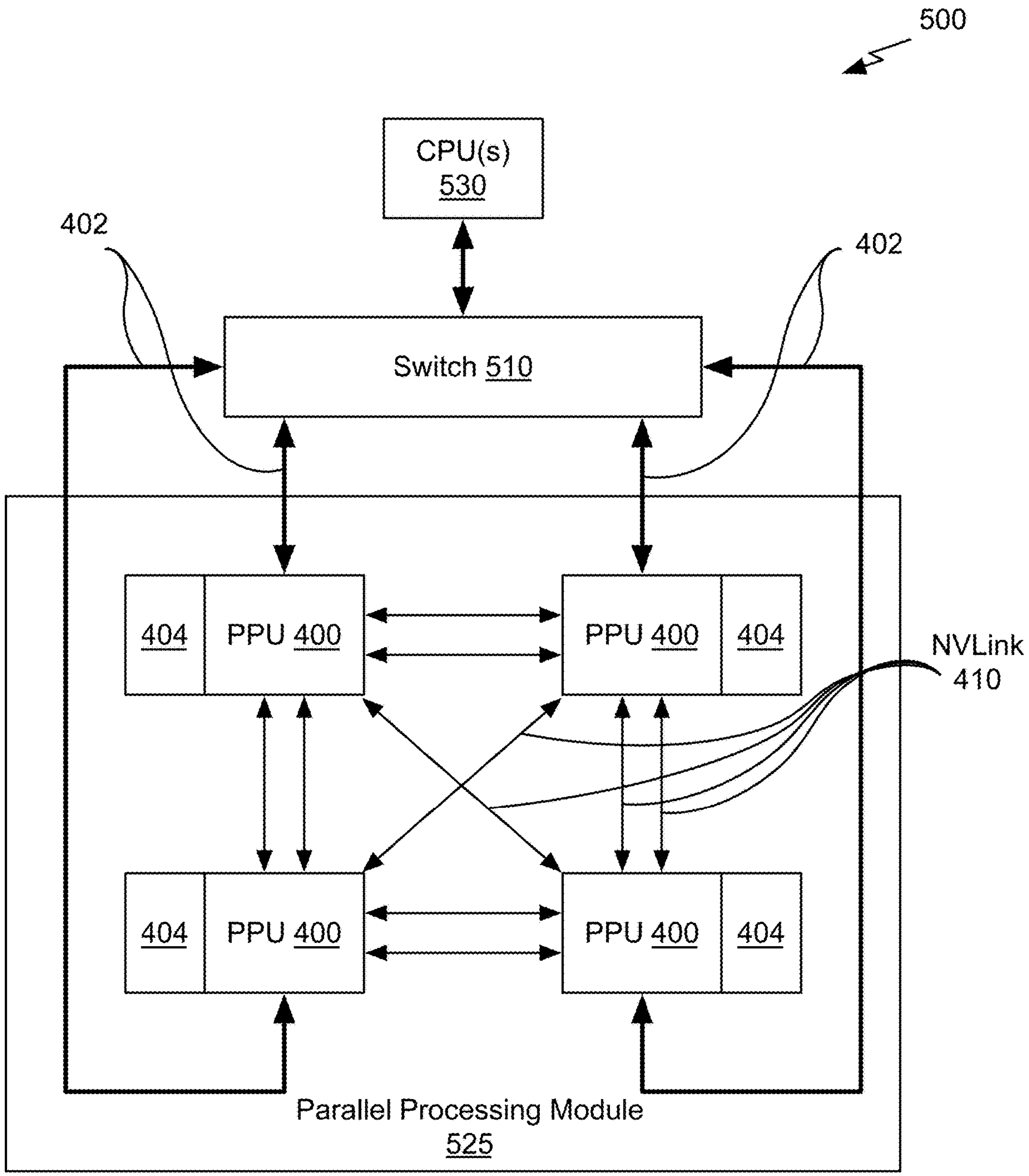
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement a system or method for training-free consistent text-to-image generation, such as the method 200, 300, and/or 350. The processing system 500 includes a CPU 530, switch 510, and multiple PPUs 400, and respective memories 404.

Figure 5B:
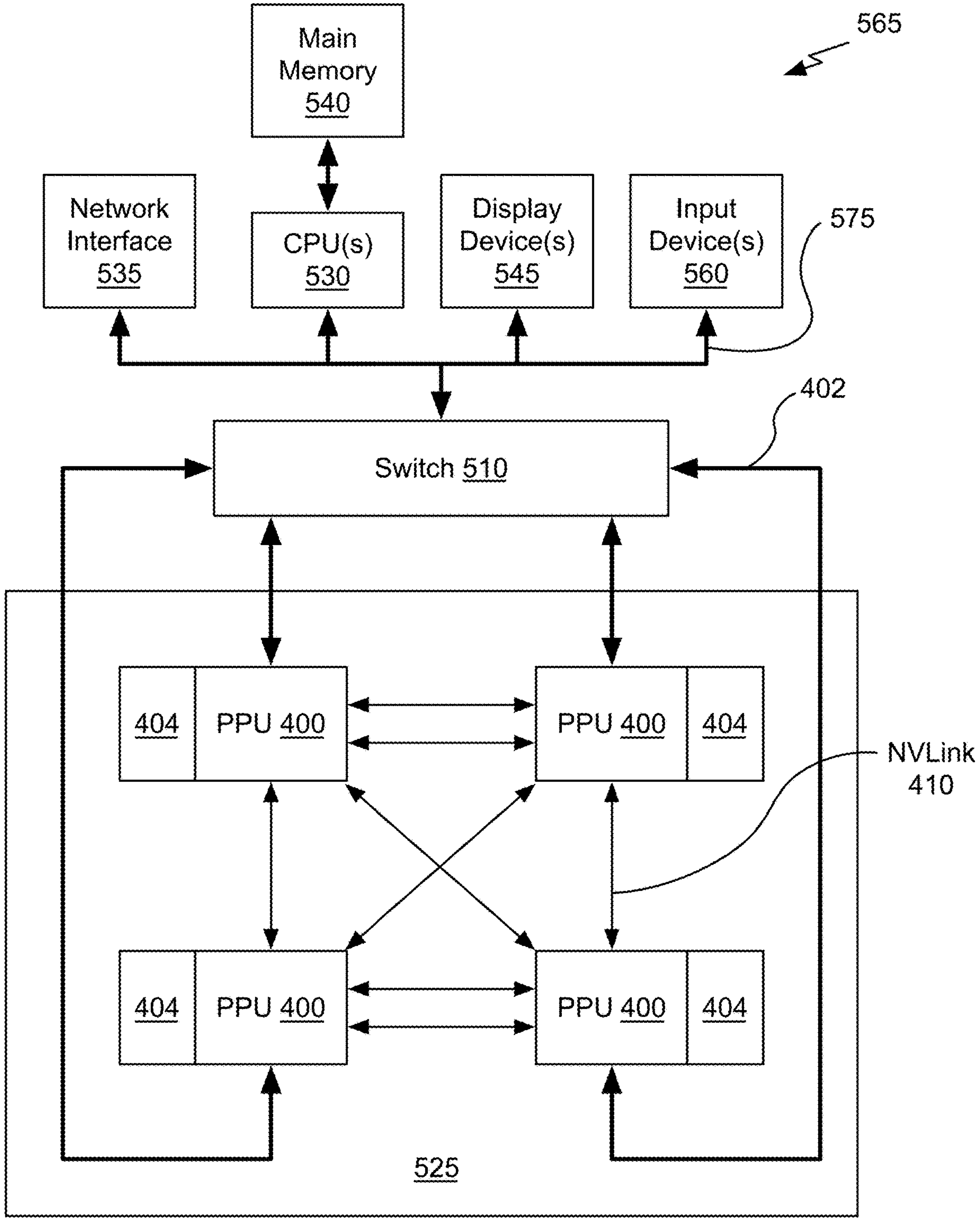
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement a system or method for training-free consistent text-to-image generation, such as the method 200, 300, and/or 350.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
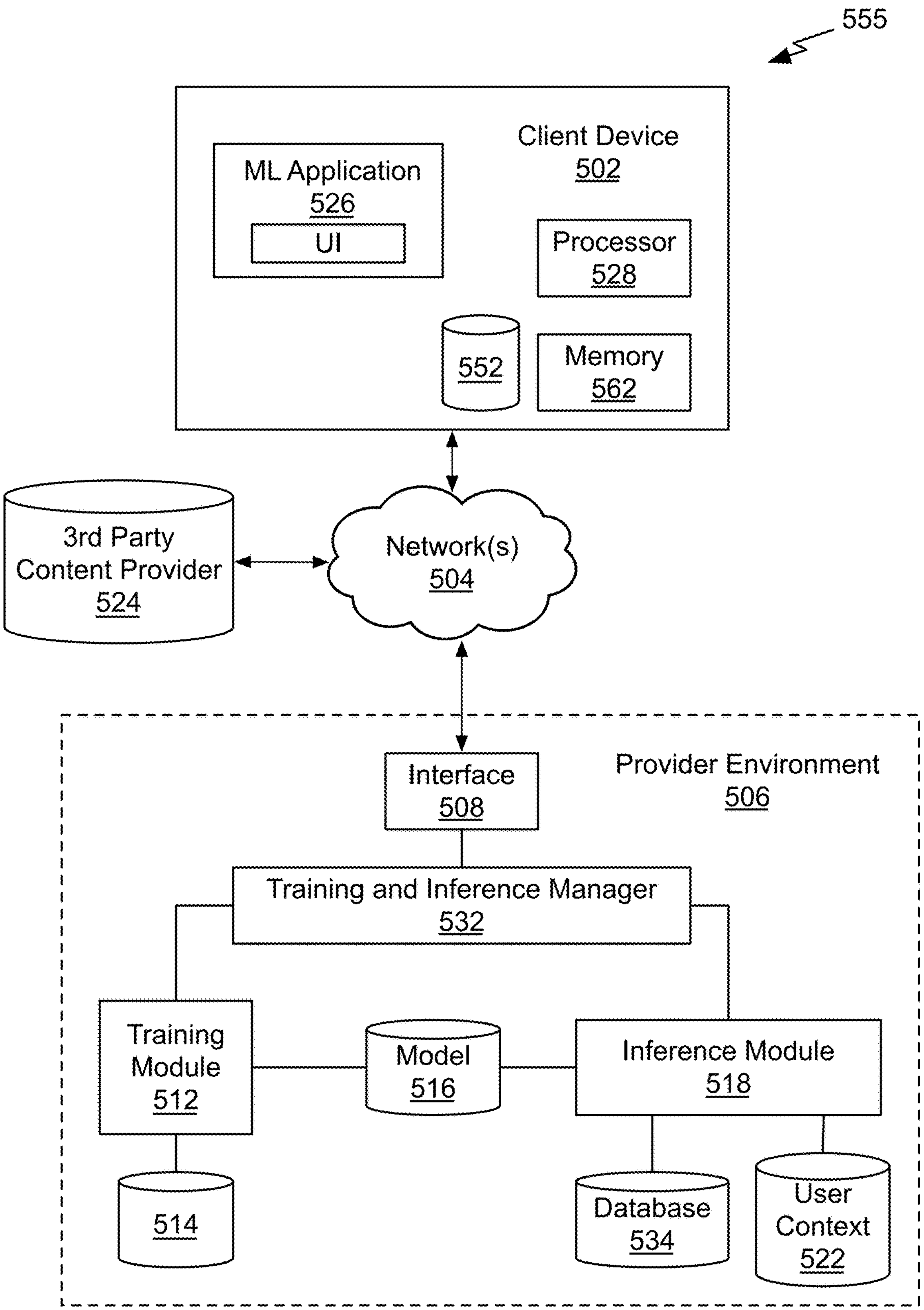
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A graphics processing pipeline may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline utilizing the hardware of the PPU 400.

Various programs may be executed within the PPU 400 in order to implement the various stages of the graphics processing pipeline. For example, the device driver may launch a kernel on the PPU 400 to perform a vertex shading stage on one processing unit (or multiple processing units). The device driver (or the initial kernel executed by the PPU 400) may also launch other kernels on the PPU 400 to perform other stages of the graphics processing pipeline, such as a geometry shading stage and a fragment shading stage. In addition, some of the stages of the graphics processing pipeline may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
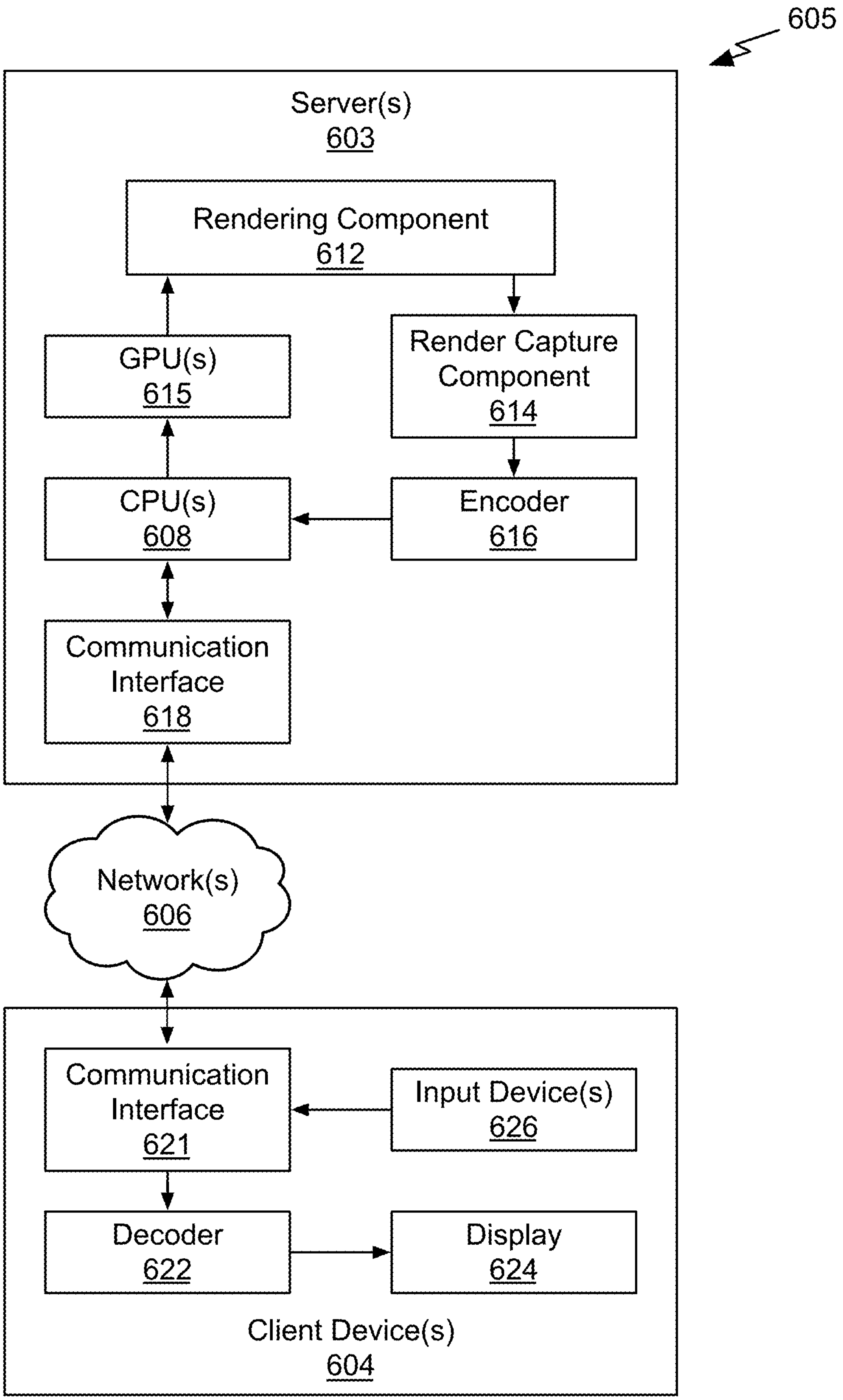
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:

receiving a text description related to a subject with two or more prompts describing scenes for generation of two or more images depicting the subject, wherein the scenes comprise at least two different scenes and each prompt is associated with a different one of the two or more images;

generating intermediate data associated with the two or more images by concurrently processing the text description with the two or more prompts by at least one layer of a neural network according to pre-trained weights without also processing an input image depicting the subject;

computing cross-image consistency data specific to the subject using the intermediate data; and processing the cross-image consistency data by at least one remaining layer of the neural network according to the pre-trained weights to generate the two or more images.

2. The computer-implemented method of claim 1, wherein computing the cross-image consistency data comprises:

computing subject masks localizing the subject in the intermediate data generated for the two or more images; and combining the subject masks to compute the cross-image consistency data.

3. The computer-implemented method of claim 2, wherein portions of the subject masks are removed when the subject masks are combined.

4. The computer-implemented method of claim 3, further comprising adjusting the portions to be removed when the subject masks are combined, according to a parameter.

5. The computer-implemented method of claim 2, further comprising:
receiving an additional text description related to an additional subject;
computing additional subject masks localizing the additional subject in the intermediate data; and
merging the subject masks and the additional subject masks before the combining.

6. The computer-implemented method of claim 2, further comprising:
denoising the intermediate data to generate denoised intermediate data; and
interpolating between the cross-image consistency data produced by combining the subject masks and the denoised intermediate data before processing the cross-image consistency data by the at least one remaining layer.

7. The computer-implemented method of claim 2, further comprising aligning common features within the cross-image consistency data before processing the cross-image consistency data by the at least one remaining layer.

8. The computer-implemented method of claim 1, wherein computing the cross-image consistency data comprises:
computing subject masks localizing the subject in the intermediate data;
combining the subject masks for the two or more prompts to compute cross-image aligned data;
extracting a correspondence map between the intermediate data produced for pairs of the two or more prompts;
identifying common features associated with the subject within the cross-image aligned data using the correspondence map; and
exchanging the common features in the cross-image aligned data to compute the cross-image consistency data.

9. The computer-implemented method of claim 1, wherein computing the cross-image consistency data comprises:
extracting a correspondence map between the intermediate data generated for pairs of the two or more images;
identifying common features within the intermediate data and associated with the subject using the correspondence map; and
exchanging the common features in the intermediate data to compute the cross-image consistency data.

10. The computer-implemented method of claim 1, wherein the pre-trained weights are determined by training the neural network to generate independent images in response to training text descriptions.

11. The computer-implemented method of claim 1, further comprising receiving a definition of the subject and processing the definition along with the text description, wherein the definition comprises one or more of additional intermediate data that are generated and stored during generation of an additional image depicting the subject, an additional correspondence map that is generated and stored during generation of an additional image depicting the subject, or an additional subject mask that is generated and stored during generation of an additional image depicting the subject.

12. The computer-implemented method of claim 1, further comprising receiving a definition of the subject and processing the definition along with the text description, wherein the definition includes a noise seed previously extracted from a real image depicting the subject.

13. The computer-implemented method of claim 1, wherein the text description is separate from the two or more prompts.

14. The computer-implemented method of claim 1, wherein the text description is included in at least one of the two or more prompts.

15. The computer-implemented method of claim 1, wherein at least one of the steps of receiving, generating, computing, or processing is performed on a server or in a data center to generate the two or more images, and the two or more images are streamed to a user device.

16. The computer-implemented method of claim 1, wherein at least one of the steps of receiving, generating, computing, or processing is performed within a cloud computing environment.

17. The computer-implemented method of claim 1, wherein at least one of the steps of receiving, generating, computing, or processing is performed for training, testing, or certifying a neural network employed in a machine, robot, or autonomous vehicle.

18. The computer-implemented method of claim 1, wherein at least one of the steps of receiving, generating, computing, or processing is performed on a virtual machine comprising a portion of a graphics processing unit.

19. A system, comprising:
a memory that stores pre-trained weights for a neural network; and
a processor that is connected to the memory, wherein the processor is configured to:
receive a text description related to a subject with two or more prompts describing scenes for generation of two or more images depicting the subject, wherein the scenes comprise at least two different scenes and each prompt is associated with a different one of the two or more images;
generate intermediate data associated with the two or more images by concurrently processing the text description with the two or more prompts by at least one layer of the neural network according to the pre-trained weights without also processing an input image depicting the subject;
compute cross-image consistency data specific to the subject using the intermediate data; and
process the cross-image consistency data by at least one remaining layer of the neural network according to the pre-trained weights to generate the two or more images.

20. The system of claim 19, wherein computing the cross-image consistency data comprises:
computing subject masks localizing the subject in the intermediate data generated for the two or more images; and
combining the subject masks to compute the cross-image consistency data.

21. A non-transitory computer-readable medium storing computer instructions that, when executed by one or more processors, cause the one or more processors to perform the steps of:

receiving a text description related to a subject with two or more prompts describing scenes for generation of two or more images depicting the subject, wherein the scenes comprise at least two different scenes and each prompt is associated with a different one of the two or more images;

generating intermediate data associated with the two or more images by concurrently processing the text description with the two or more prompts by at least one layer of a neural network according to pre-trained weights without also processing an input image depicting the subject;

computing cross-image consistency data specific to the subject using the intermediate data; and processing the cross-image consistency data by at least one remaining layer of the neural network according to the pre-trained weights to generate the two or more images.

22. The non-transitory computer-readable mediummedia of claim 21, wherein computing the cross-image consistency data comprises:

computing subject masks localizing the subject in the intermediate data generated for the two or more images; and combining the subject masks to compute the cross-image consistency data.

* * * * *